(12) United States Patent
Smolka et al.

(10) Patent No.: US 12,044,840 B2
(45) Date of Patent: Jul. 23, 2024

(54) ACTUATOR FOR AN OPTICAL DEVICE, PARTICULARLY FOR TUNING THE OPTICAL POWER OF A LIQUID LENS

(71) Applicant: OPTOTUNE CONSUMER AG, Dietikon (CH)

(72) Inventors: Stephen Smolka, Zürich (CH); Johannes Haase, Dietikon (CH); Sanggyu Biern, Zürich (CH)

(73) Assignee: NEXTLENS SWITZERLAND AG, Dietikon (CH)

( * ) Notice: Subject to any disclaimer, the term of this patent is extended or adjusted under 35 U.S.C. 154(b) by 498 days.

(21) Appl. No.: 17/418,847

(22) PCT Filed: Dec. 20, 2019

(86) PCT No.: PCT/EP2019/086842
§ 371 (c)(1),
(2) Date: Jun. 28, 2021

(87) PCT Pub. No.: WO2020/136140
PCT Pub. Date: Jul. 2, 2020

(65) Prior Publication Data
US 2022/0057628 A1 Feb. 24, 2022

(30) Foreign Application Priority Data
Dec. 28, 2018 (EP) .................................. 18248286

(51) Int. Cl.
| | | |
|---|---|---|
| *G02B 3/14* | (2006.01) | |
| *G02B 7/04* | (2021.01) | |
| *G02B 26/08* | (2006.01) | |
| *H01F 7/02* | (2006.01) | |
| *H01F 7/06* | (2006.01) | |

(52) U.S. Cl.
CPC ........... *G02B 26/0875* (2013.01); *G02B 3/14* (2013.01); *G02B 7/04* (2013.01); *H01F 7/0289* (2013.01)

(58) Field of Classification Search
CPC ........ G02B 26/0875; G02B 3/14; G02B 7/04; H01F 7/0289; H01F 7/066; H02K 41/0356
See application file for complete search history.

(56) References Cited

U.S. PATENT DOCUMENTS

| | | |
|---|---|---|
| 5,666,235 A | 9/1997 | Izuka |
| 2010/0328782 A1 | 12/2010 | Suzuki et al. |
| 2015/0069860 A1 | 3/2015 | Reiter et al. |

FOREIGN PATENT DOCUMENTS

| | | |
|---|---|---|
| CN | 101501534 | 8/2009 |
| CN | 104280795 | 1/2015 |
| EP | 1953903 | 8/2008 |
| FR | 2959345 | 10/2011 |
| JP | 2002323584 | 11/2002 |
| KR | 20180123376 | 11/2018 |
| WO | 2010066459 | 6/2010 |

*Primary Examiner* — Ryan D Howard
(74) *Attorney, Agent, or Firm* — JMB Davis Ben-David

(57) ABSTRACT

The present invention relates to an actuator 1 for an optical device 100, comprising a movable mover 10 comprising a coil 11, wherein the mover 10 is configured to be connected to a piston 70 for moving the piston 70, a support structure (20) wherein the mover (10) is movable with respect to the support structure (20), and two magnet structures (30, 31) configured to interact with the coil (11) to move the mover (20) and therewith the piston (70), wherein the two magnet structures (30, 31) are connected to the support structure (20) such that the coil (11) is arranged between the two magnet structures (30, 31).

17 Claims, 17 Drawing Sheets

Fig. 12
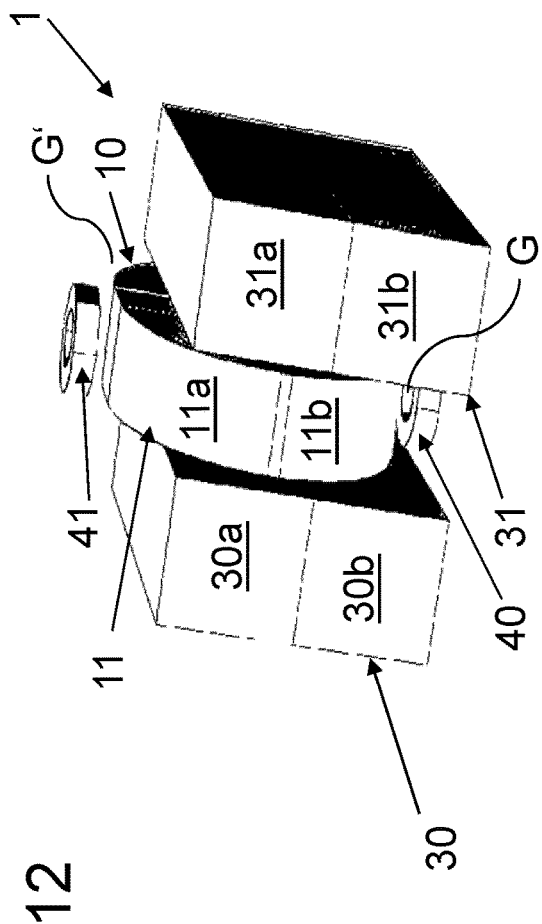
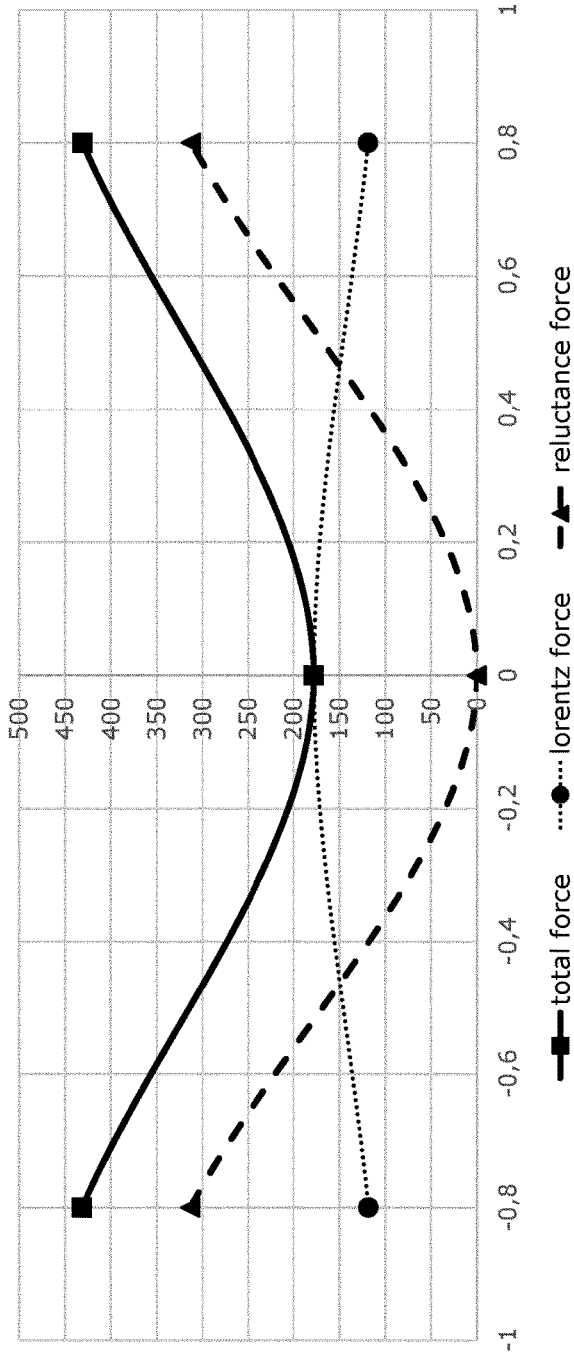

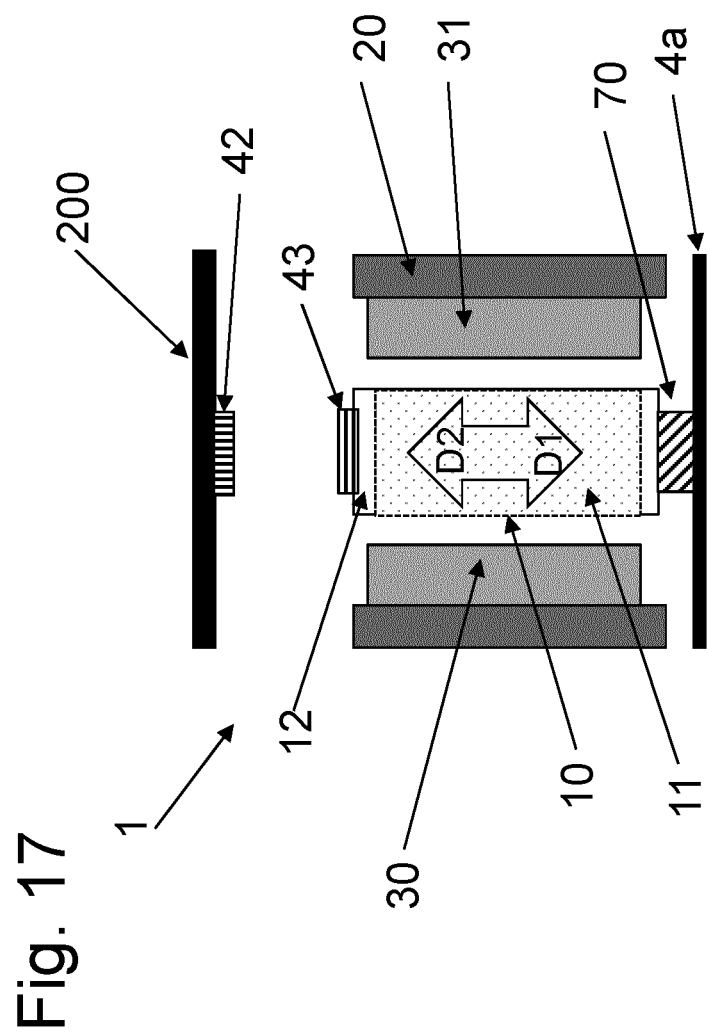

ACTUATOR FOR AN OPTICAL DEVICE, PARTICULARLY FOR TUNING THE OPTICAL POWER OF A LIQUID LENS

CROSS-REFERENCE TO RELATED APPLICATIONS

This is the US National Stage of International Patent Application No. PCT/EP2019/086842 filed Dec. 20, 2019, which claims priority to European Patent Application No. 18248286.9 filed Dec. 28, 2018.

The present invention relates to an actuator for an optical device, particularly a liquid lens.

Such actuators are used in a variety of different applications. One particular application is to use such an actuator to adjust the optical power (i.e. the reciprocal value of the focal length) of a liquid lens.

In this regard it is often mandatory to have an actuator that only needs a relatively small installation space, can be easily mounted to the optical device and allows a precise adjustment of the optical property in question, e.g. the optical power of a lens.

Therefore, it is an objective of the present invention to provide an improved actuator that is particularly applicable to tuning the optical power of an optical device such as a liquid lens.

This problem is solved by an actuator lens having the features of claim 1.

Preferred embodiments of the present invention are stated in the respective sub claims and are described below.

According to claim 1 an actuator for an optical device is disclosed, comprising:
- a movable mover comprising a coil, wherein the mover is configured to be connected to a piston (e.g. of an optical device) for moving the piston,
- a support structure, wherein the mover is movable with respect to the support structure, and
- two magnet structures configured to interact with the coil to move the mover (and therewith the piston), wherein the two magnet structures are connected to the support structure such that the coil is arranged between the two magnet structures.

Particularly, according to the present invention, the mover comprises a coil and the magnet structures are stationary. However, the coil and magnet structures can also be interchanged. Particularly, the coil can be connected to the support structure and the mover may comprise at least one magnet structure for interacting with the coil (so as to move the mover).

According to an embodiment of the present invention, the coil (and therewith the mover) is configured to be moved relative to the support structure in a first motion direction or in an opposite second motion direction depending on the direction of an electrical current flowing through the coil (i.e. clockwise or counter-clockwise).

Further, according to an embodiment of the present invention, the coil comprises a first portion in which an electrical current generated in the coil flows in a first current direction, and wherein the electrical coil comprises a second portion in which the electrical current flows in a second current direction, wherein the first current direction is oriented opposite to the second current direction.

Further, according to an embodiment of the present invention, each magnet structure comprises a first portion having a first magnetization and a second portion having a second magnetization, wherein the first and the second magnetization point in opposite directions. Particularly, the portions of the magnet structures can be formed by separate magnets. Alternatively, the magnet structures may be magnetized so as to receive the portions with corresponding magnetizations.

Further, according to an embodiment of the present invention, the first portion of the first magnet structure faces the first portion of the second magnet structure, and wherein the first portion of the coil is arranged between the first portion of the first magnet structure and the first portion of the second magnet structure, and wherein the second portion of the first magnet structure faces the second portion of the second magnet structure, and wherein the second portion of the coil is arranged between the second portion of the first magnet structure and the second portion of the second magnet structure.

Further, according to an embodiment of the present invention, the first magnetizations of the first portions of the magnet structures extend perpendicular to the first current direction, and wherein the second magnetizations of the second portions of the magnet structures extend perpendicular to the second current direction such that a Lorentz force acts on each portion of the coil when an electrical current flows through the electrical coil, which Lorentz forces move the mover in the first motion direction or in the second motion direction depending on the orientation of the first and second current direction (for a given orientation of the magnetizations).

Further, according to an embodiment of the present invention, the actuator comprises a first magnetic flux guiding member that is connected to the mover such that the first magnetic flux guiding member is separated from the two magnet structures by a first air gap to generate a reluctance force that acts on the mover in the second motion direction, and particularly increases when the first air gap gets smaller upon movement of the mover in the second motion direction (particularly corresponding to a pulling motion of the mover/piston).

Further, according to an embodiment of the present invention, the first magnetic flux guiding member comprises a recess for receiving a portion of the mover.

Further, according to an embodiment of the present invention, the first magnetic flux guiding member is a first magnetic flux guiding ring member, i.e. comprises an annular shape. This means that the guiding member can comprise a circular shape. However, the magnetic flux guiding member may also comprise a rectangular outer contour/shape or another shape that particularly allows to define a suitable air gap and to connect the guiding member to the mover.

Further, according to an embodiment of the present invention, the actuator comprises a second magnetic flux guiding member that is connected to the mover such that the second magnetic flux guiding member is separated from the magnet structures by a second air gap to generate a reluctance force that acts on the mover in the first motion direction, and particularly increases when the second air gap get smaller upon movement of the mover in the first motion direction (particularly corresponding to a pushing motion of the mover/piston).

Further, according to an embodiment of the present invention, the second magnetic flux guiding member is a second magnetic flux guiding ring member, i.e. comprises an annular shape, too. Other shapes are also possible (e.g. as explained in conjunction with the first magnetic flux guiding member).

Particularly, the first and/or the second magnetic flux guiding member is formed out of a soft magnetic material, i.e., the coercive field strength is of the order of or lower than the earth's magnetic field (approximately 40 A/m). Possible soft magnetic materials are e.g. polycrystalline Fe, $Fe_{15}Ni_{80}Mo_5$, sintered ferrites, iron silicon alloys, iron nickel alloys, etc.

Further, according to an embodiment of the present invention, the actuator comprises a control unit configured to control movement of the mover, wherein the control unit is configured to adjust an electrical current applied to the coil of the mover such that an actual position of the mover approaches a desired position of the mover, wherein the actuator preferably comprises a Hall sensor that is configured to measure a magnetic field of a permanent magnet of the actuator that is preferably arranged on the mover to provide an output signal indicative of the actual position of the mover.

Further, according to an embodiment of the present invention, the coil comprises an electrical conductor (e.g. a wire) that forms a plurality of windings, wherein the windings extend around a coil axis of the coil and along a circumferential direction of the coil. Particularly, the coil axis extends essentially perpendicular to the plane of the windings.

Particularly, according to an embodiment, the coil axis extends parallel to the magnetizations of the magnet structures.

Further, according to an embodiment of the present invention, the mover comprises a frame that holds the coil.

Further, according to an embodiment of the present invention, the frame surrounds the coil in the circumferential direction of the coil.

Further, according to an embodiment of the present invention, the frame comprises a front side and a back side facing away from the front side.

Further, according to an embodiment of the present invention, the frame comprises a top side and a bottom side, wherein particularly the bottom side faces away from the top side, and wherein the top side is connected via the front side and the back side of the frame to the bottom side of the frame.

Further, according to an embodiment of the present invention, the front side of the frame comprises a through hole that is at least partially filled with a glue to bond the coil to the frame, and/or wherein the back side of the frame comprises a through hole that is at least partially filled with a glue to bond the coil to the frame. These through holes are therefore also denoted as glue pockets.

Further, according to an embodiment of the present invention, the top side of the frame comprises a through hole, wherein a first end section of the conductor of the coil extends through the through hole of the top side to provide an electrical connection to the coil, and/or wherein the bottom side of the frame comprises a through hole, wherein a second end section of the conductor of the coil extends through the through hole of the bottom side to provide an electrical connection to the coil.

Further, according to an embodiment of the present invention, the frame comprises a first protrusion on the front side of the frame for limiting a movement of the mover in the first and in the second motion direction. Particularly, said through hole provided on the front side of the frame is formed in the first protrusion of the first side of the frame.

Further, according to an embodiment of the present invention, the frame comprises a second protrusion on the back side of the frame for limiting a movement of the mover in the first and in the second motion direction. Particularly, this through hole provided on the back side of the frame is formed in the second protrusion.

Further, according to an embodiment of the present invention, the bottom side of the frame comprises a pin for insertion into a through hole of the piston, wherein the pin protrudes from a stop arranged on the bottom side of the frame, wherein the stop is configured to butt against the piston to prevent the pin from protruding out of the through hole of the piston when the pin is inserted in the through hole o the piston. Instead of a pin/through hole interface also other interfaces can be provided. Particularly, to this end, the frame comprises a member that is configured to engage with a structure of the piston to achieve a positioning and/or fixation of the mover with respect to the piston.

Further, according to an embodiment of the present invention, the actuator comprises a housing surrounding the magnet structures and the mover, wherein the magnet structures are connected to an inside of the housing, and wherein particularly the housing comprises a top portion (e.g. a circumferential top edge portion) and a bottom portion (e.g. a circumferential bottom edge portion).

Further, according to an embodiment of the present invention, the actuator comprises a first spring connecting the mover to the housing (particularly to said top region of the housing of the actuator) to allow a movement of the mover in the first and in the second motion direction, but to suppress a movement of the mover in a plane perpendicular to the first and second motion direction.

Further, according to an embodiment of the present invention, the first spring comprises four arms extending from a central fastening portion of the first spring to an outer circumferential fasting portion of the first spring, wherein the respective arm comprises a meandering shape, wherein the central fastening portion is connected to the top side of the frame, and wherein the outer fastening portion is connected to the housing.

Particularly, the central fastening portion is glued to the top side of the frame of the mover. Particularly, the outer fastening region is glued to the housing. Particularly, the outer fastening portion comprises two opposing undulated edges, particularly to increase an effective glue area.

Further, according to an embodiment of the present invention, the top side of the frame comprises a recess (e.g. a blind hole or a groove) that is at least partially filled with a glue to bond the central fastening portion of the first spring to the top side of the frame.

Further, according to an embodiment of the present invention, the first spring is connected in an electrically conducting fashion to the first end section of the conductor of the coil, wherein the first spring comprises an electrical contact configured to connect the first spring to an electrical current source, wherein the first spring is configured to guide an electrical current provided by the current source to the first end section of the conductor of the coil.

Further, according to an embodiment of the present invention, the actuator comprises a second spring connecting the mover to the housing (particularly to the bottom side of the housing) to allow a movement of the mover in the first and in the second motion direction and to suppress a movement of the mover in a direction perpendicular to the first and second motion direction.

Further, according to an embodiment of the present invention, the second spring comprises four arms extending from a central fastening portion of the second spring to an outer circumferential fasting portion of the second spring, wherein the respective arm comprises a meandering shape, wherein the central fastening portion of the second spring is connected to the bottom side of the frame, and wherein the outer fasting portion of the second spring is connected to the housing.

Particularly, the central fastening portion is glued to the bottom side of the frame of the mover. Particularly, the outer fastening region of the second spring is glued to the housing. Particularly, the outer fastening portion comprises two opposing undulated edges, particularly to increase an effective glue area.

Further, according to an embodiment of the present invention, the second spring is connected in an electrically conducting fashion to the second end section of the conductor of the coil, wherein the second spring comprises an electrical contact configured to connect the second spring to an electrical current source, wherein the second spring is configured to guide an electrical current provided by the current source to the second end section of the conductor of the coil.

Further, according to an embodiment of the present invention, the housing is configured to guide a movement of the mover with respect to the first and the second motion direction, wherein the mover is supported via ball bearings on the housing.

Further, according to an embodiment of the present invention, the housing comprises a first guiding recess, wherein the first protrusion of the frame of the mover engages with the first guiding recess, and wherein the first guiding recess forms a stop for the first protrusion so as to limit a movement of the mover in the first and in the second motion direction.

Further, according to an embodiment of the present invention, the housing comprises a second guiding recess (which particularly faces the first guiding recess), wherein the second protrusion of the frame of the mover engages with the second guiding recess, and wherein the second guiding recess forms a stop for the second protrusion so as to limit a movement of the mover in the first and in the second motion direction.

Further, according to an embodiment of the present invention, the housing comprises a first through hole adjacent the first magnet structure, which first through hole is at least partially filled with a glue to connect the first magnet structure to the housing, and wherein the housing comprises an opposing second through hole adjacent the second magnet structure, which second through hole is at least partially filled with a glue to connect the second magnet structure to the housing.

Further, according to an embodiment of the present invention, the housing is configured to be connected to the optical device to mount the actuator to the optical device.

Further, according to an embodiment of the present invention, the housing comprises a plurality of legs protruding from the bottom side of the housing, wherein the legs are configured to connect the housing to the optical device, wherein particularly the legs are configured to engage with the optical device to connect the housing to the optical device.

Further, according to an embodiment of the present invention, the housing comprises a plurality of projections on the top side of the housing, wherein each projection is inserted in a recess formed in the outer fastening portion of the first spring.

Further, according to an embodiment of the present invention, the housing comprises a plurality of projections on the bottom side of the housing, wherein each projection on the bottom side of the housing is inserted in a recess formed in the outer fastening portion of the second spring.

Further, according to an embodiment of the present invention, the housing comprises a first wall and an opposing second wall, wherein the first and the second wall are connected by a third and a fourth wall of the housing.

Further, according to an embodiment of the present invention, the first guiding recess is formed in the first wall of the housing of the actuator.

Further, according to an embodiment of the present invention, the second guiding recess is formed in the second wall of the housing of the actuator.

Further, according to an embodiment of the present invention, the first through hole is formed in the third wall, and wherein the second through hole is formed in the fourth wall.

Further, according to an embodiment of the present invention, the housing comprises four legs for mounting the actuator to an optical device, wherein two legs protrude from the third wall at the bottom portion of the housing, while the other two legs protrude from the fourth wall at the bottom portion of the housing of the actuator.

Further, according to an embodiment of the present invention, two projections of said plurality of projections for connecting the housing to the first spring protrude from the first wall at the top portion of the housing, and wherein two further projections of said plurality of projections protrude from the second wall at the top portion of the housing.

Further, according to an embodiment of the present invention, two projections of said plurality of projections for connecting the housing to the second spring protrude from the first wall at the bottom portion of the housing, and wherein two further projections of said plurality of projections protrude from the second wall at the bottom portion of the housing of the actuator.

Further, according to an embodiment of the present invention, the second wall comprises at least one projection configured to engage with a hole formed in the third wall, and at least one bendable projection configured to engage with a hole formed in the fourth wall. In this fashion the first, third and fourth wall can be connected to one another to form a u-shaped housing section. Afterwards, the second wall can be brought into engagement with the third wall and thereafter with the fourth wall of the housing utilizing the bendable projection.

Yet another aspect of the present invention relates to a tool for mounting two magnet structures for an actuator (particularly an actuator according to the present invention) to a housing section for the actuator, wherein the tool comprises two recesses separated by a wall, wherein each recess is configured to receive one of the magnet structures, and wherein the tool is configured to engage with the housing section such that the housing section covers the recesses when the respective magnet structure is arranged in its associated recess of the tool to allow gluing the housing section to the respective magnet (e.g. via the through holes in the third and fourth wall of the housing).

Particularly, the tool can comprise a magnet adjacent each recess to help align the respective magnet structure when it is placed in the respective recess.

Particularly, said housing section comprises the first, third and fourth wall that are connected to one another to form a u-shaped housing section.

Furthermore, according to an aspect of the present invention a method for mounting two magnet structures to a housing section of an actuator (particularly an actuator according to the present invention) is disclosed, wherein the method uses the tool according to the present invention, wherein each magnet structure is arranged in one of the recesses of the tool, the housing section is arranged on the tool such that it covers the magnet structures arranged on the tool, and the magnet structures are glued to the housing section (using the through holes of the third and fourth wall), and wherein the housing section is removed from the tool after having glued the magnet structures to the housing section.

According to a further aspect of the present invention, an optical device is disclosed, wherein the optical device comprises an actuator according to the present invention and a piston connected to an elastically deformable or flexible wall member of the optical device, wherein the mover is connected to the piston for deforming the wall member.

According to an embodiment of the optical device, the optical device is a lens having an adjustable focal power, wherein the lens comprises a container, wherein the container comprises:
- a lens volume filled with a transparent fluid, wherein the fluid preferably is a transparent liquid,
- a reservoir volume filled with the fluid and connected to the lens volume (e.g. via a channel),
- a frame structure forming a lateral wall of the container, wherein the frame structure comprises a first recess for accommodating at least a portion of the lens volume, and wherein the frame structure comprises a second recess for accommodating at least a portion of the reservoir volume,
- an elastically deformable and transparent membrane connected to the frame structure,
- a lens shaping element connected to the membrane, wherein the lens shaping element comprises a circumferential edge defining an area of the membrane having an adjustable curvature,
- a transparent bottom wall connected to the frame structure so that the lens volume is arranged between said area of the membrane and said bottom wall,
- and wherein said elastically deformable wall member is arranged adjacent the reservoir volume and configured to be deformed by the piston to pump fluid from the reservoir volume into the lens volume or from the lens volume into the reservoir volume to adjust the curvature of said area of the lens and therewith the optical power of the lens.

Particularly, for adjusting the curvature of said area of the lens and therewith the optical power of the lens, the mover and therewith the piston is configured to be moved relative to the support structure in the first motion direction so that the piston is pushed against the elastically deformable wall member of the container to pump fluid from the reservoir volume into the lens volume, or relative to the support structure in the second motion direction so that the piston pulls on the elastically deformable wall member of the container to pump fluid from the lens volume into the reservoir volume.

Furthermore, according to an embodiment of the optical device, the piston comprises an octagonal bottom surface connected to the elastically deformable wall member.

Furthermore, according to an embodiment of the optical device, the piston is formed by a plate comprising said bottom surface as well as an opposing octagonal top surface, wherein the piston comprises a through hole extending from the top surface to the bottom surface of the piston configured to receive said pin of the frame of the mover of the actuator.

Furthermore, according to an embodiment of the optical device, the reservoir volume comprises an octagonal cross-sectional area.

Furthermore, according to an embodiment of the optical device, the reservoir volume of the container is arranged laterally next to the lens volume of the container in a direction perpendicular to the optical axis of the lens.

Furthermore, according to an embodiment of the optical device, the frame structure is formed by a monolithic plate member.

Furthermore, according to an embodiment of the optical device, the optical device comprises a further membrane which is comprised by the bottom wall and connected to the frame structure.

Furthermore, according to an embodiment of the optical device, the bottom wall comprises a flat transparent plate arranged on the further membrane, so that the further membrane is arranged between the frame structure and the transparent plate.

Furthermore, according to an embodiment of the optical device, the lens shaping element comprises a first through-opening forming said circumferential edge, wherein the first through-opening is closed by said area of the membrane.

Furthermore, according to an embodiment of the optical device, for protecting said area of the membrane, the lens shaping element is connected to the frame structure such that the membrane is arranged between the frame structure and the lens shaping element, so that particularly the lens shaping element protrudes beyond said area of the membrane in the direction of the optical axis of the lens/optical device.

Furthermore, according to an embodiment of the optical device, the first recess of the frame structure of the container of the lens comprises an inner diameter that is larger than an inner diameter of the circumferential edge of the first through-opening of the lens shaping element.

Furthermore, according to an embodiment of the optical device, the lens shaping element comprises a second through-opening, wherein the second through-opening is closed by the elastically deformable wall member.

Furthermore, according to an embodiment of the optical device, the second through-opening comprises an octagonal shape.

Furthermore, according to an embodiment of the optical device, the elastically deformable wall member of the container is formed by the membrane.

Particularly, the actuator according to the present invention can be used for a variety of different applications. Particularly, the actuator according to the present invention can form a component of one of the following optical devices:
- an optical zoom camera module (e.g. comprising two or more liquid lenses having an adjustable optical power, e.g. a lens as described herein)
- an adjustable telescope,
- a beam expander,
- a collimator,
- an auto focus (AF) system for a camera (tele, wide angle, folded tele, etc.),
- a macro focusing system for a cameras (tele, wide angle, folded tele, etc.),
- a microscope (e.g. with continuous magnification, autofocus, or constant working distance),
- IOT vision device, e.g. with autofocus, optical zoom, macro (bar code readers, machine vision, etc.),
- laser projection with different working distance (fast auto focus).

In the following, further features as well as embodiments of the present invention are described with reference to the Figures that are appended to the claims, wherein:

FIG. 12 shows the possibility to use reluctance forces to support a Lorentz force generated by the actuator by means of a first and a second magnetic flux guiding ring member connected to the mover, respectively;

FIG. 17 shows control of the movement of the actuator using a permanent magnet connected to the mover and a stationary Hall sensor.

Figure 1:
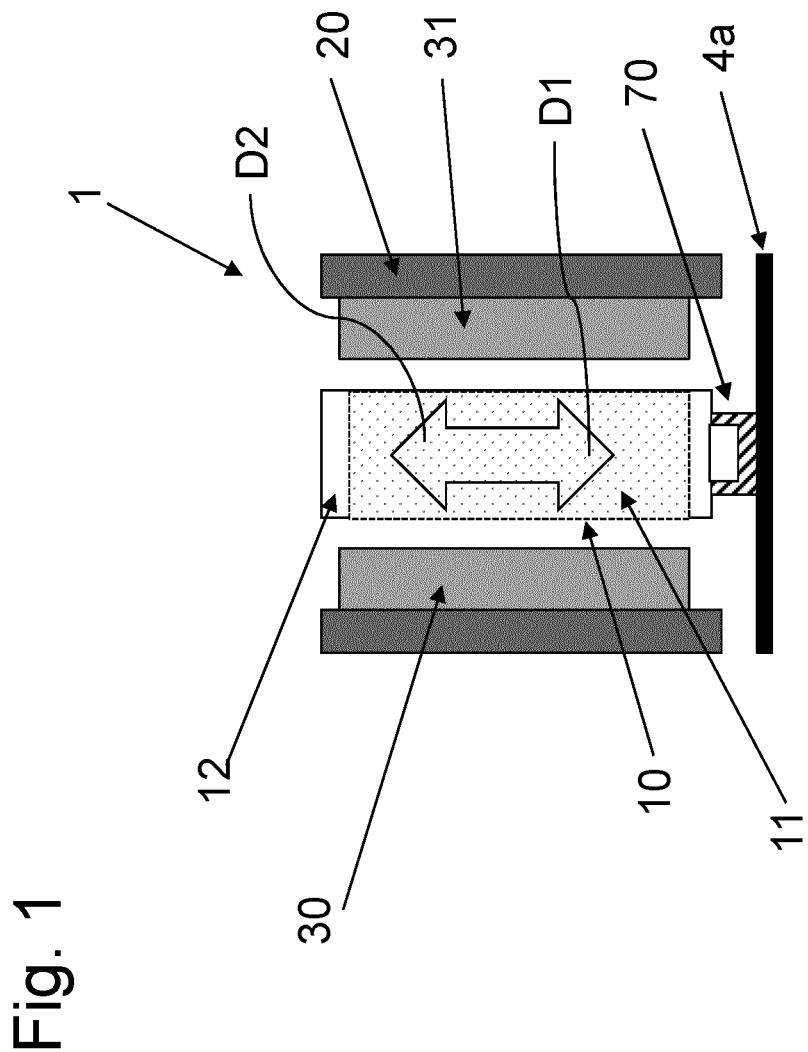
FIG. 1 shows a schematical cross sectional view of an embodiment of an actuator according to the present invention.

FIG. 1 shows an embodiment of an actuator 1 according to the present invention that can be used to adjust an optical property of an optical device 100 such as a lens having an adjustable optical power. The actuator 1 comprises a movable mover 10 comprising a coil 11, wherein the mover 10 is configured to be connected to a piston 70 for moving the piston 70 (the piston may also form a component of the actuator 1), a support structure 20, wherein the mover 10 is movable with respect to the support structure 20 (e.g. in first and in an opposite second motion direction D1, D2), two magnet structures 30, 31 configured to interact with the coil 11 to move the mover 10 and therewith the piston 70, wherein the two magnet structures 30, 31 are connected to the support structure 20 such that the coil 11 is arranged between the two magnet structures 30, 31.

Advantageously, less power consumption can be achieved in the moving coil design. This is due to the fact that the volumes required by the coil and magnet structure, respectively, are smaller and larger than those of a typical moving magnet design. Therefore, the power consumption of the moving coil design is less in a given size of the actuator.

Furthermore, the moving coil design is more stable, since the moving coil is nearly independent from the magnetic effect from the housing, which attracts the coil.

Further, in contrast to the moving magnet design, a reluctance forces can be used to help generating stronger actuator forces. As a result, the moving coil design consumes less power for a given actuator force.

Furthermore, the moving coil design generates less magnetic stray fields.

Figure 2:
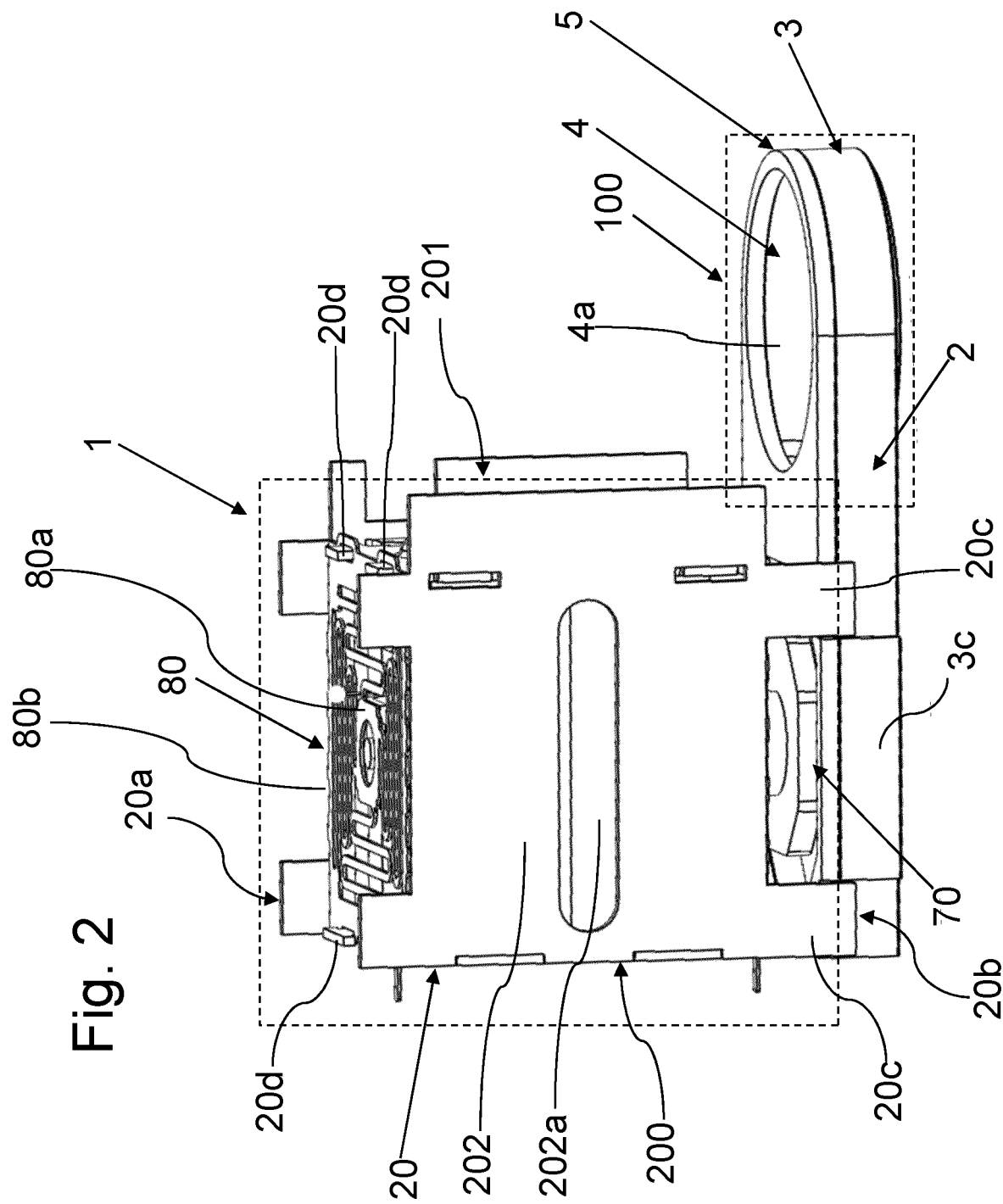
FIG. 2 shows a perspective view of an embodiment of an actuator according to the present invention that is mounted to an optical device in the form of a lens having an adjustable optical power, wherein the actuator drives a piston that is used to tune the optical power of the lens.
Figure 3:
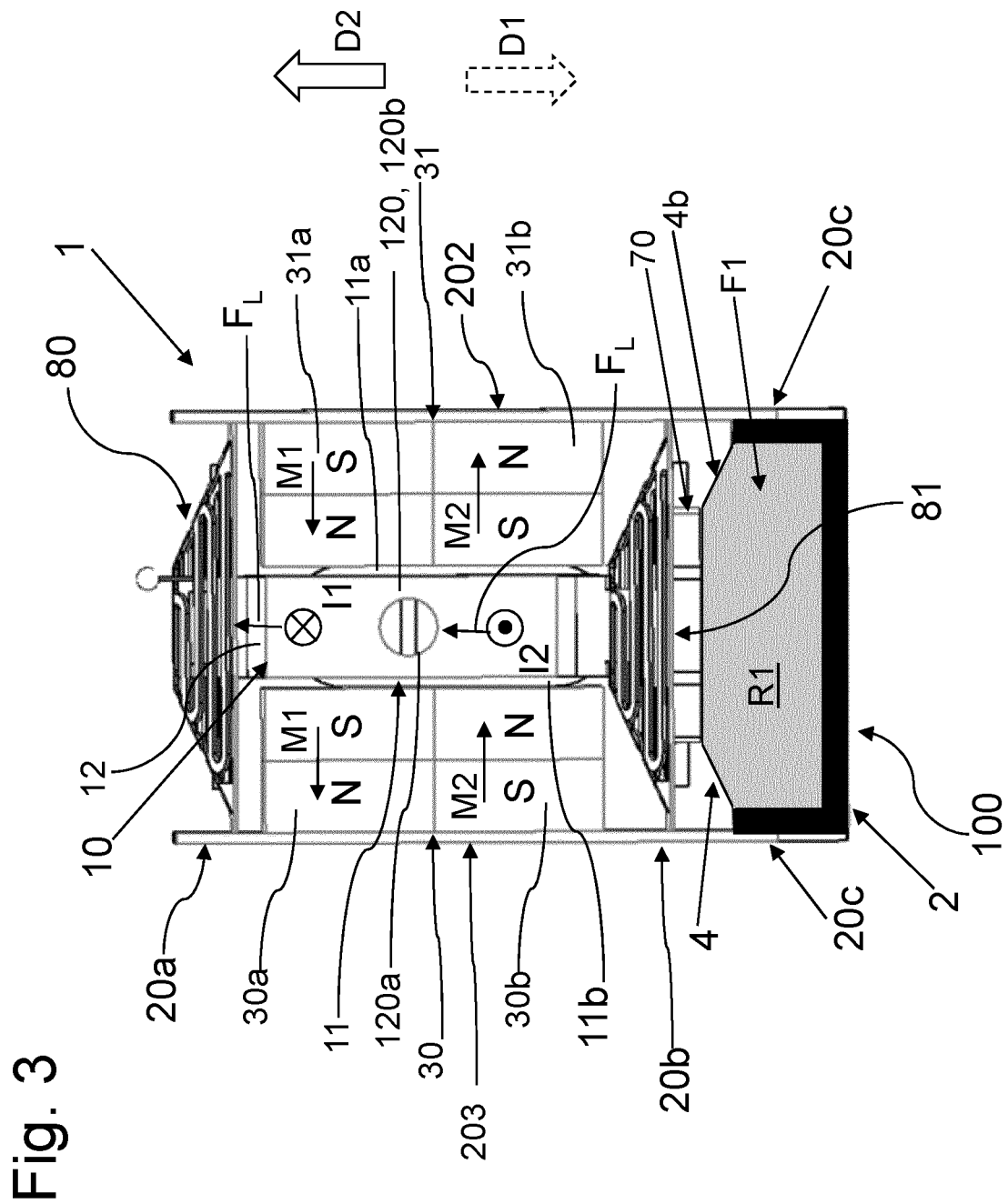
FIG. 3 shows a cross sectional view of the actuator shown in FIG. 2.
Figure 4:
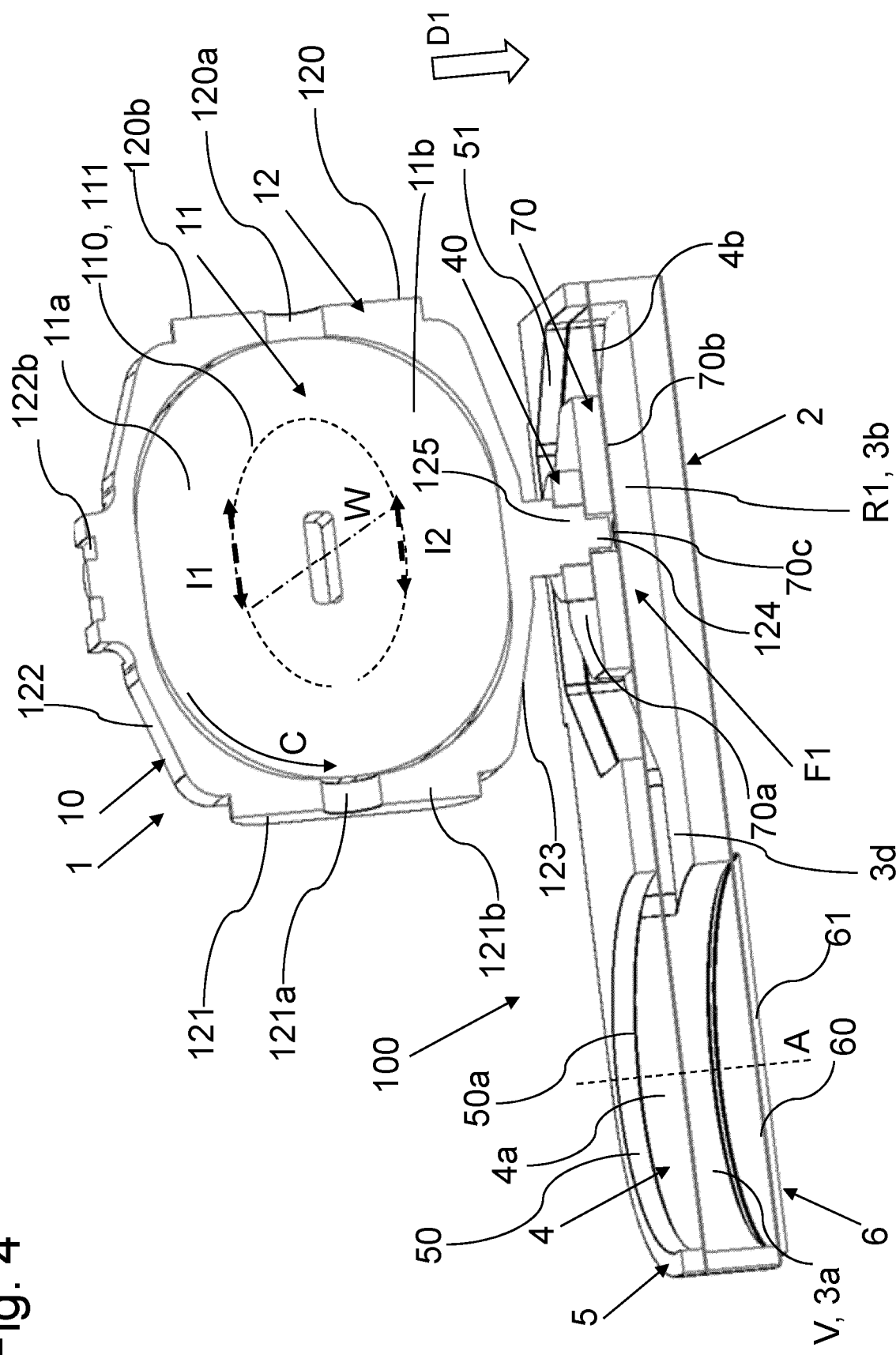
FIG. 4 shows a cross-sectional view of a mover of the actuator shown in FIG. 2. as well as a cross-sectional of the optical device (lens) to which the mover is coupled via a piston.

FIG. 2 shows in conjunction with FIGS. 3 and 4 an embodiment of an actuator 1 according to the present invention, wherein here, as indicated in FIG. 3, the coil 11 comprises a first portion 11a in which an electrical current generated in the coil 11 flows in a first current direction I1, and wherein the electrical coil 11 comprises a second portion 11b in which the electrical current flows in a second current direction I2, wherein the first current direction I1 is oriented opposite to the second current direction I2.

Particularly, each magnet structure 30, 31 comprises a first portion 30a, 31a having a first magnetization M1 and a second portion 30b, 31b having a second magnetization M2, wherein the first and the second magnetization M1, M2 point in opposite directions.

Furthermore, the first portion 30a of the first magnet structure 30 faces the first portion 31a of the second magnet structure 31, and wherein the first portion 11a of the coil 11 is arranged between the first portion 30a of the first magnet structure 30 and the first portion 31a of the second magnet structure 31. In the same manner, the second portion 30b of the first magnet structure 30 faces the second portion 31b of the second magnet structure 31, wherein the second portion 11b of the coil 11 is now arranged between the second portion 30b of the first magnet structure 30 and the second portion 31b of the second magnet structure 31.

To achieve favourable Lorenz Forces $F_L$ for moving the mover 10 down in the first direction D1 (push) or up in the second direction D2 (pull) the first magnetizations M1 of the first portions 30a, 31a of the magnet structures 30, 31 extend perpendicular to the first current direction I1, and wherein the second magnetizations M2 of the second portions 30b, 31b of the magnet structures 30, 31 extend perpendicular to the second current direction I2 such that a Lorentz force $F_L$ acts on each portion 11a, 11b of the coil 11 when an electrical current flows through the electrical coil 11, which Lorentz forces $F_L$ move the mover 10 in the first motion direction D1 or in the second motion direction D2 depending on the orientation of the first and second current direction I1, I2.

Figure 9:
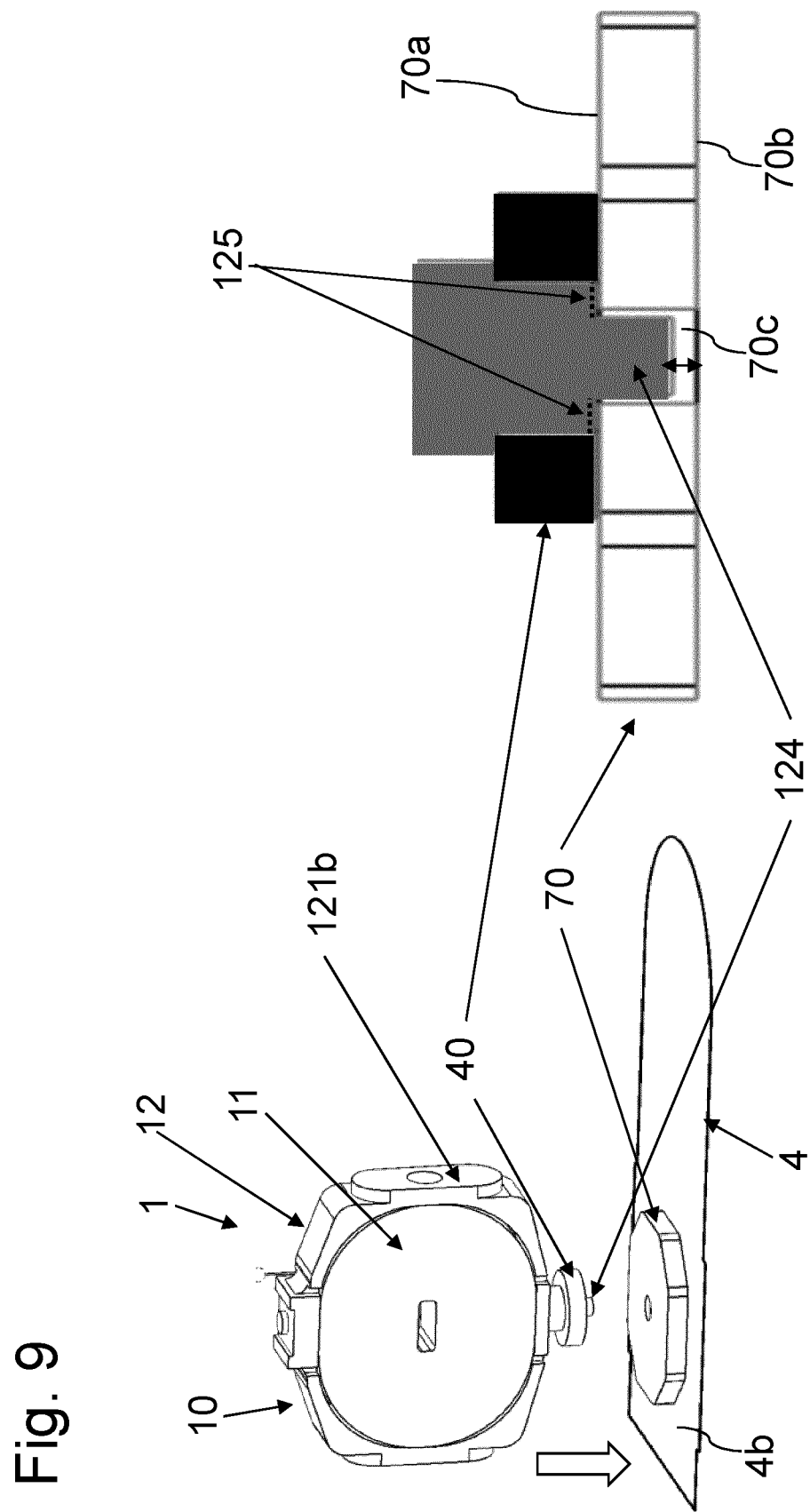
FIG. 9 shows an exploded view (left-hand side) and a cross-sectional view (right-hand side) of a coupling of the mover of the actuator shown in FIG. 2 to the piston.

As shown FIGS. 4 and 9, for coupling the mover 10 to a piston 70 of an optical device 100, the bottom side 123 of the frame 12 comprises a pin 124 for insertion into a through hole 70c of the piston 70, which through hole 70c extends from a top surface 70a to a bottom surface 70b of the piston 70. Particularly, the pin 124 protrudes from a stop 125 arranged on the bottom side 123 of the frame 12, wherein the stop 125 is configured to butt against the piston 70 to prevent the pin 124 from protruding out of the through hole 70c of the piston 70 when the pin 124 is inserted in the through hole 70c of the piston 70. Preferably, in an embodiment, as indicated in FIG. 4 the piston 70 is formed by a plate having an octagonal top surface 70a and an opposing octagonal bottom surface 70b that is connected to an elastically deformable wall member 4b of the optical device 100. Other contours/shapes of the piston 70 are also possible, wherein the respective shape particularly corresponds to the shape of a cross-section of a reservoir volume R1 (and recess 51) parallel to the bottom surface 70b of the piston 70, wherein the bottom surface 70b is smaller, to have a circumferential free portion of a deformable wall member 4b covering the reservoir volume R1, see below.

Particularly, as shown as an example in FIGS. 2 and 4, the optical device 100 that is to be tuned by means of actuator 1 can be a lens 100 having an adjustable optical power. According to an embodiment, the optical device is a lens 100 having an adjustable optical power, wherein the lens 100 comprises a container 2, wherein the container 2 comprises: a lens volume V filled with a transparent fluid F1, a reservoir volume R1 filled with the transparent fluid F1 and connected to the lens volume V (particularly via a channel 3d), a frame structure 3 forming a lateral wall of the container 2, wherein the frame structure 3 comprises a first (e.g. circular) recess 3a for accommodating at least a portion of the lens volume V, and wherein the frame structure 3 comprises a second recess 3b for accommodating at least a portion of the reservoir volume R1, an elastically deformable and transparent membrane 4 connected to the frame structure 3, a lens shaping element 5 connected to the membrane 4, wherein the lens shaping element 5 comprises a circumferential edge 50a defining an area 4a of the membrane 4 having an adjustable curvature, and a transparent bottom wall 6 connected to the frame structure 3 so that the lens volume V is arranged between said area 4a of the membrane 4 and said bottom wall. Preferably, the reservoir volume R1 comprises an octagonal cross section corresponding to the octagonal bottom surface 70b of the piston 70.

Particularly, said elastically deformable wall member 4b is arranged adjacent the reservoir volume R1 and configured to be deformed by the piston 70 coupled to the mover 10 of the actuator 1 to pump fluid F1 from the reservoir volume R1 into the lens volume V or from the lens volume V into the reservoir volume R1 to adjust the curvature of said area 4a of the lens 100 and therewith the optical power of the lens 100.

Particularly, for adjusting the curvature of said area 4a of the membrane 4 the lens 100 and therewith the optical power of the lens 100, the mover 10 and therewith the piston 70 is configured to be moved relative to the support structure/housing 20 in the first motion direction D1 so that the piston 70 is pushed against the elastically deformable wall member 4b of the container 2 to pump fluid F1 from the reservoir volume R1 into the lens volume V, or relative to the support structure/housing 20 in the second motion direction D2 so that the piston 70 pulls on the elastically deformable wall member 4b of the container 2 to pump fluid F1 from the lens volume V into the reservoir volume R1.

As further shown in FIG. 4, the reservoir volume R1 of the container 2 is arranged laterally next to the lens volume V of the container 2 in a direction perpendicular to the optical axis A of the lens 100. Furthermore, the bottom wall 6 preferably comprises a transparent and elastically deformable membrane 60, too, that is connected to the frame structure 3, wherein the bottom wall 6 further comprises a flat transparent plate 61 arranged on the further membrane 60, so that the further membrane 60 is arranged between the frame structure 3 and the transparent plate 61.

Preferably, the lens shaping element 5 comprises a first through-opening 50 forming said circumferential edge 50a, wherein the first through-opening 50 is closed by said area 4a of the membrane 4. Particularly, for protecting said area 4a of the membrane 4, the lens shaping element 5 is connected to the frame structure 3 such that the membrane 4 is arranged between the frame structure 3 and the lens shaping element 5, so that particularly the lens shaping element 5 protrudes beyond said area 4a of the membrane 4 in the direction of an optical axis A of the lens 1.

Furthermore, according to an embodiment of the optical device, the first recess 50 of the frame structure 3 comprises an inner diameter that is larger than an inner diameter of the circumferential edge 50a of the first through-opening 50 of the lens shaping element 5. Further, for providing access to the elastically deformable wall member 4b, the lens shaping element 5 comprises an octagonal second through-opening 51, wherein the second through-opening 51 is covered by the elastically deformable wall member 4b. Preferably, the elastically deformable wall member 4b of the container 2 is formed by the membrane 4.

Using the actuator 1 and the piston 70 driven by the actuator 1, the optical power of the lens 100 can be adjusted.

Particularly, with respect to the neutral state shown in FIG. 4, when the mover 10 pushes the piston 70 in the first motion direction D1 against the wall member 4b, the latter develops a dent and thus pushes fluid F1 out of the reservoir volume R1 via the channel 3d into the lens volume V such that said area 4a of the membrane 4 of the lens 1 develops a corresponding convex shape and the optical power of the lens 1 increases. On the other hand, when the mover 10 pulls on the piston structure 70, the latter pulls on the wall member 4b which then bulges outwards and thus pumps fluid F1 from the lens volume V to the reservoir volume R1 such that the flat area 4a develops a concave curvature and the optical power decreases (assumes negative values). Any intermediary deflection state between convex and concave can thus be realized in a continuous fashion by means of the piston 70 acting on the elastically deformable wall member 4b.

Figure 10:
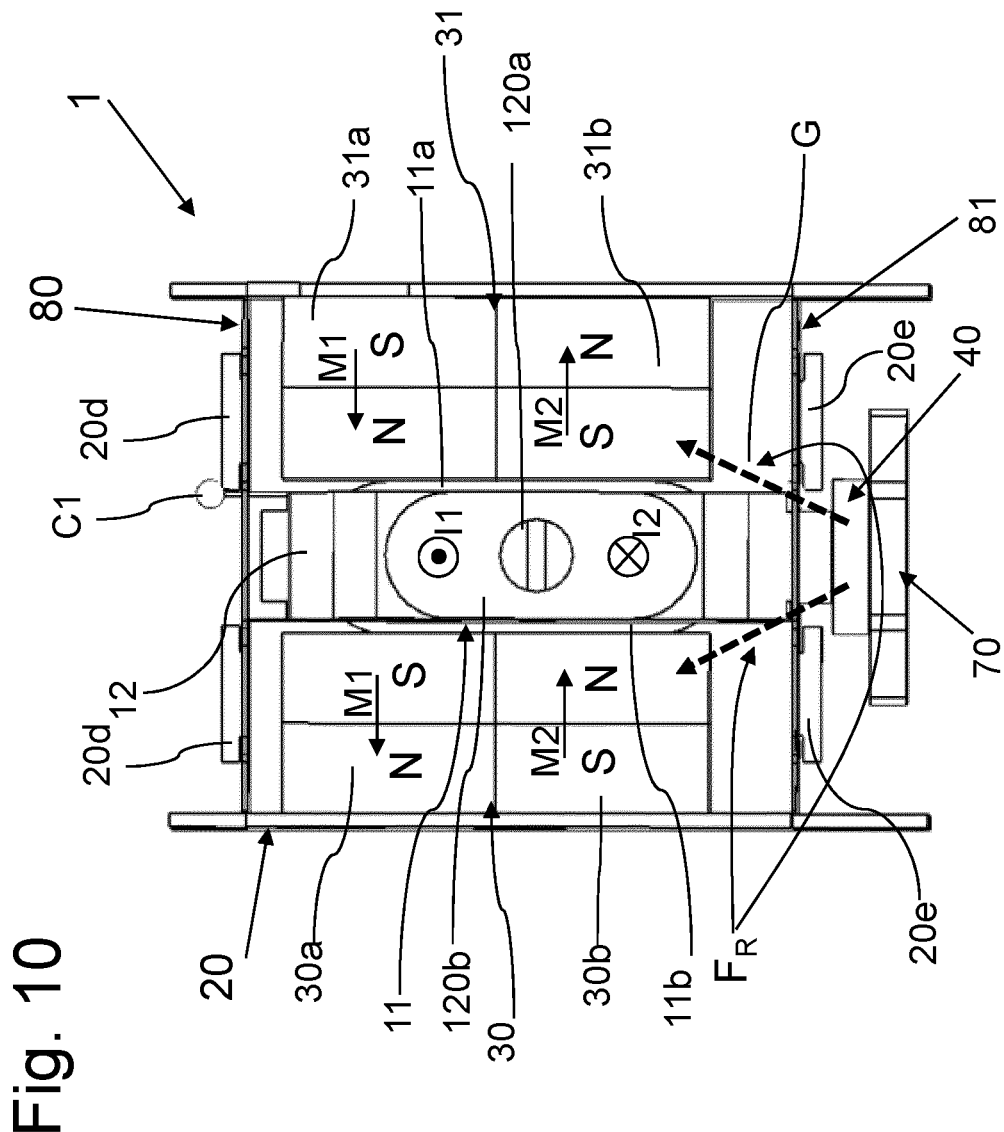
FIG. 10 shows a view of the magnet structures, frame and coil of the mover of the actuator shown in FIG. 2.
Figure 11:
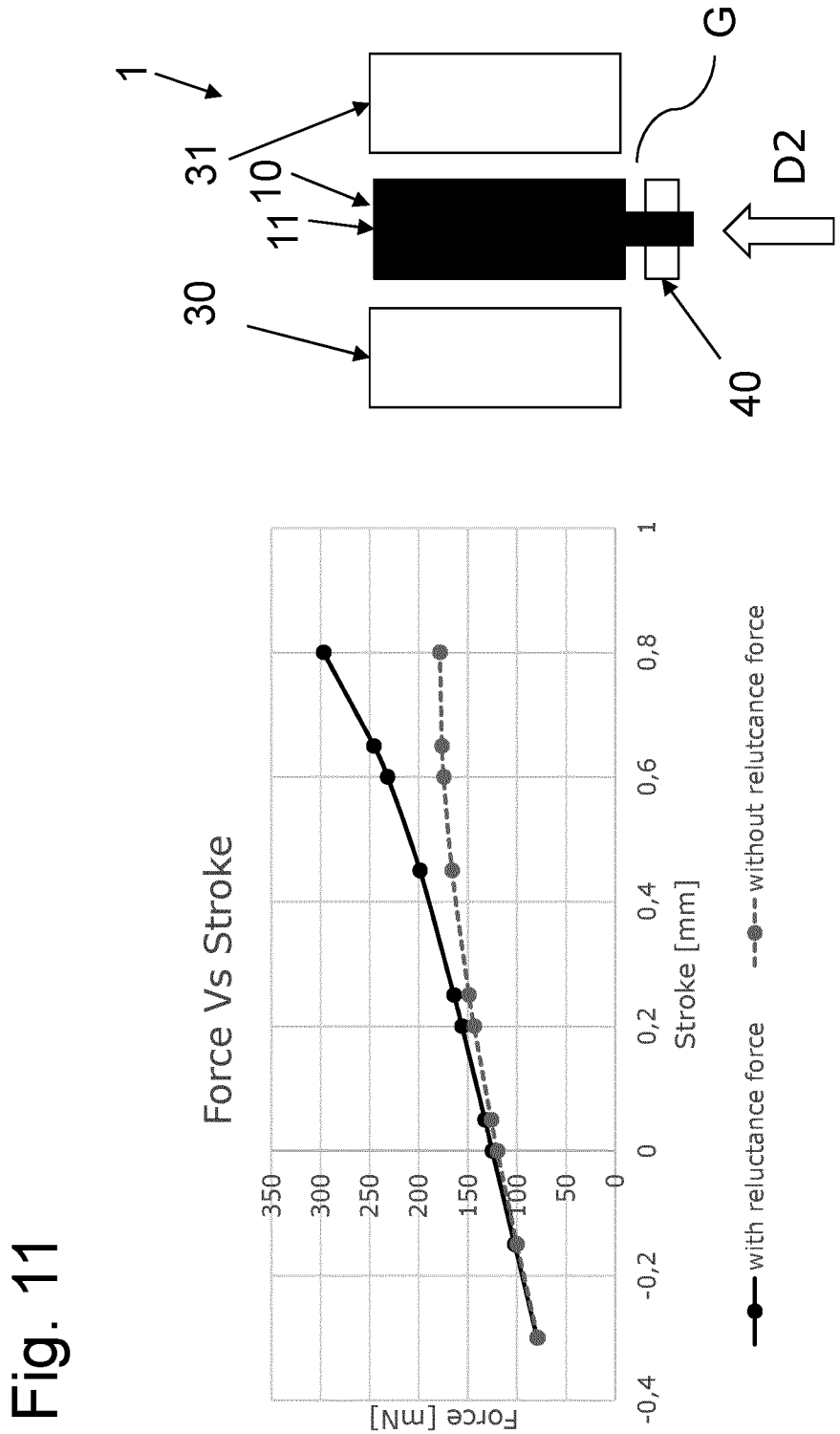
FIG. 11 shows the possibility to use a reluctance force to support a Lorentz force generated by the actuator by means of a first magnetic flux guiding ring member connected to the mover.

Particularly, the Lorentz forces $F_L$ that can be generated using the magnet structures 30, 31 and the coil 11 can be supported by additional reluctance forces $F_R$ as also indicated in FIGS. 10 to 12.

Particularly, as shown in FIGS. 10 and 11, the actuator 1 can additionally comprise a first magnetic flux guiding member 40 that is connected to the mover 10 such that the first magnetic flux guiding member is separated from the two magnet structures 30, 31 by a first air gap G to generate a reluctance force $F_R$ that acts on the mover 10 in the second motion direction D2, and particularly increases when the first air gap G gets smaller upon movement of the mover 10 in the second motion direction D2. Preferably, the member 40 comprises an annular shape.

The graph on the left-hand side of FIG. 11 shows that the actuator force that can be achieved with the additional reluctance force increases significantly with increasing stroke in the second direction D2 (pull).

According to FIG. 12, this principle can be exploited for both motion directions D1 and D2. To this end, the actuator 1 further comprises a second (preferably annular) magnetic flux guiding member 41 that is connected to the mover 10 such that the second magnetic flux guiding member 41 is separated from the magnet structures 30, 31 by a second air gap G' to generate a reluctance force $F_R$ that acts on the mover 10 in the first motion direction D1. This reluctance force $F_R$ increases when the second air gap G' gets smaller upon movement of the mover 10 in the first motion direction D1.

The actuator force enhancing effect due to the reluctance forces $F_R$ is depicted in the graph of FIG. 12 in the lower portion of FIG. 12.

Furthermore, for controlling the actuator 1 the actuator 1 can comprise a control unit that is configured to control a movement of the mover 10 in the first or in the second motion direction D1, D2 as illustrated in FIG. 17, wherein the control unit is configured to adjust an electrical current flowing through the coil 11 such that an actual position of the mover 10 approaches a desired position of the mover 10, wherein the actuator 1 comprises a Hall sensor 42 that is configured to measure a magnetic field of a permanent magnet 43 of the actuator 1 that is arranged on the mover 10 to provide an output signal indicative of the actual position of the mover 10.

Figure 7:
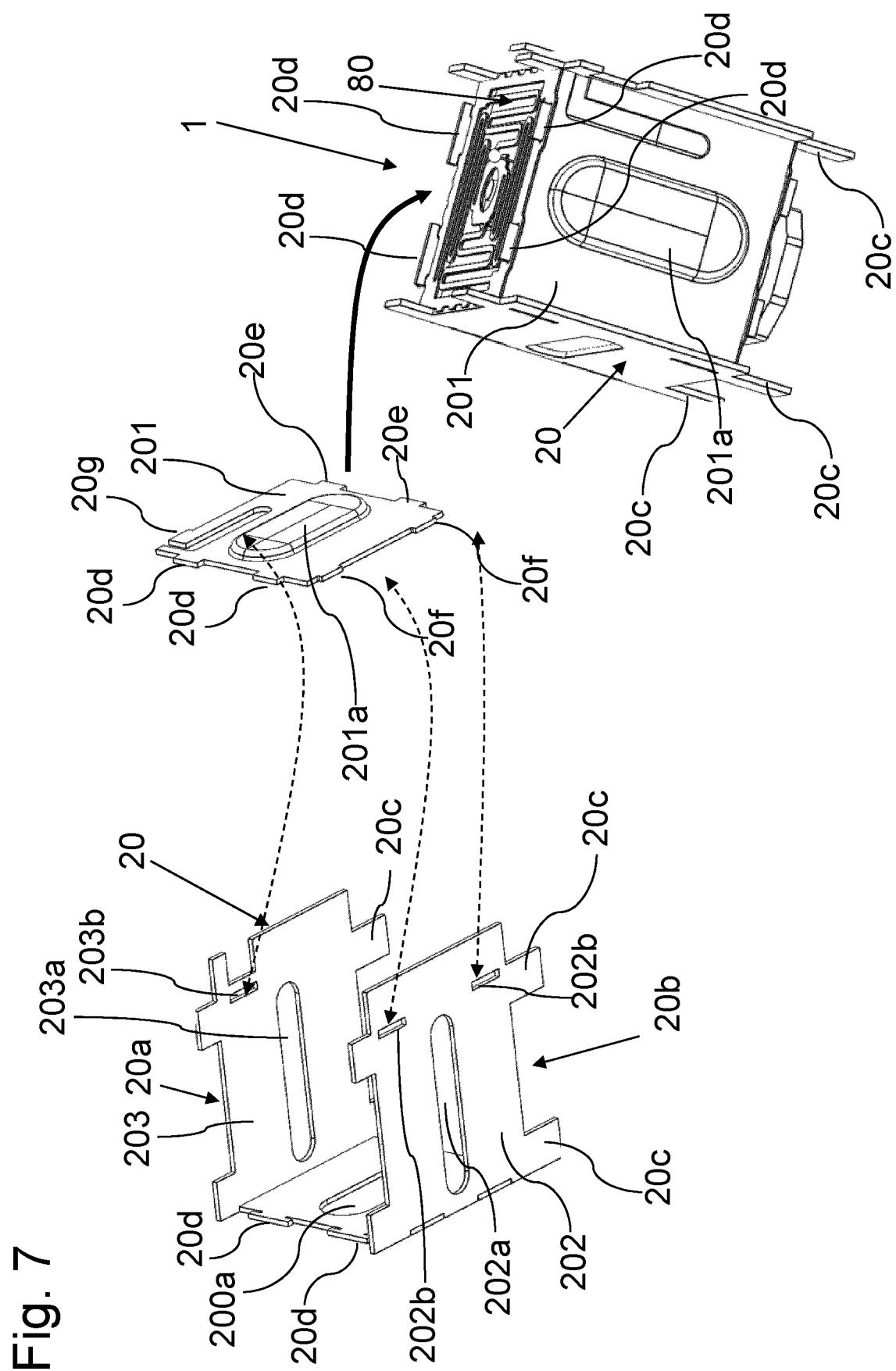
FIG. 7 shows a perspective view of an assembly of a housing of the actuator shown in FIG. 2.
Figure 8:
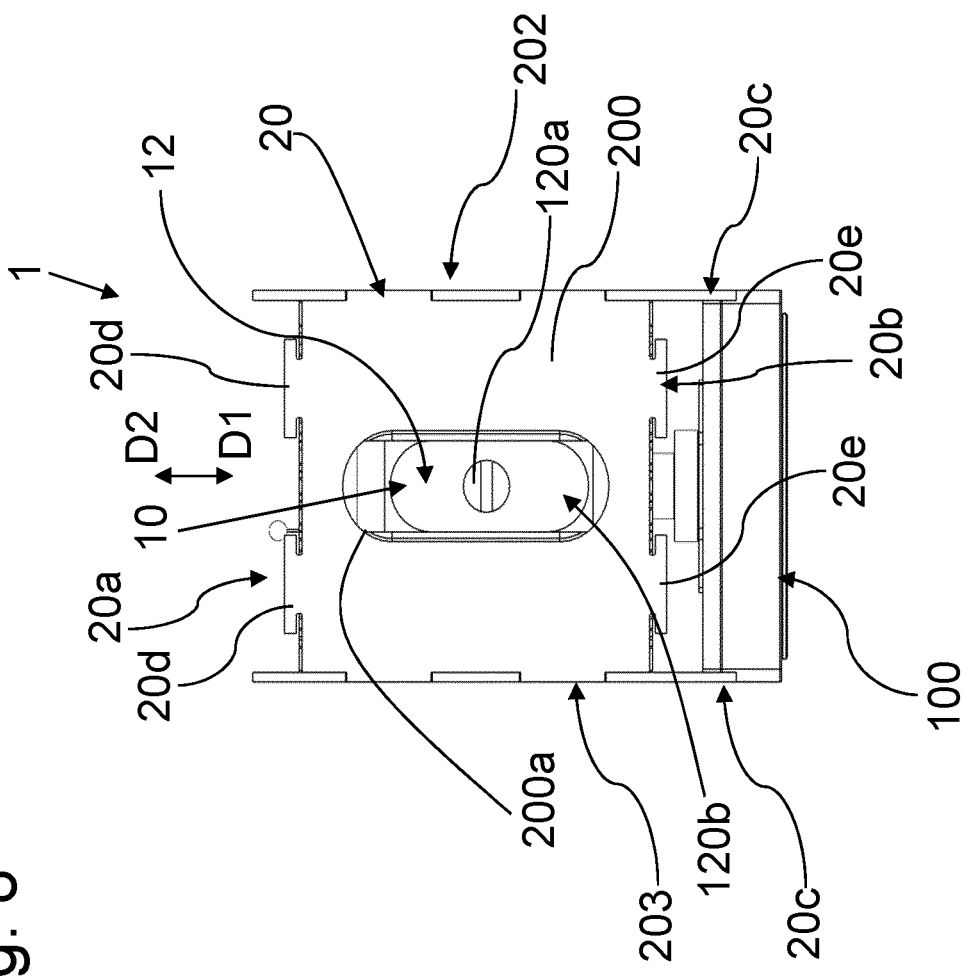
FIG. 8 shows a plan view onto a first side of the housing of the actuator shown in FIG. 2.

Furthermore, as illustrated in FIGS. 2, 7 and 8, the support structure 20 preferably forms a housing 20 surrounding the magnet structures 30, 31 and the mover 10, wherein the magnet structures 30, 31 are preferably connected to an inside of the housing 20, and wherein particularly the housing 20 comprises a top portion 20a and a bottom portion 20b. Particularly, the housing 20 comprises a first wall 200 and an opposing second wall 201, wherein these to walls are connected via a third and a fourth wall.

Preferably, for guiding and limiting the movement of the mover 10 of the actuator 1, the housing 20 preferably comprises a first guiding recess 200a formed in the first wall 200 and a second guiding recess 201a formed in the second wall 201 of the housing 20.

Furthermore, for connecting, particularly gluing, the magnet structure 30, 31 to the housing, the third wall preferably comprises a first through hole 202a adjacent the first magnet structure 30, while the fourth wall comprises an opposing second through hole 203a adjacent the second magnet structure 31. Both through holes 202a, 203a are preferably at least partially filled with a glue to glue the respective magnetic structure 30, 31 to its associated wall 202, 203 of the housing 20.

Further, for mounting the housing 20 of the actuator 1 to an optical device 100, such as the above-described lens 100, the actuator's housing 20 preferably comprises four legs 20c protruding from the bottom portion 20b of the housing 20, wherein the legs 20c are configured to engage with the protruding portion 3c of the container 2 of the optical device/lens 100 to connect the housing 20 to the optical device 100.

Particularly, two of the legs 20c protrude from the third wall 202 at the bottom portion 20b of the housing 20, while the other two legs 20c protrude from the fourth wall 203 at the bottom portion 20b of the housing 20.

Furthermore, to allow an easy assembly of the walls 200, 201, 202, 203 as shown in FIG. 7, the second wall 201 comprises at least one projection 20f configured to engage with a hole 202b formed in the third wall 202, and at least one bendable projection 20g configured to engage with a hole 203b formed in the fourth wall 203. This allows one to connect at first the third 202 and the fourth wall 203 to the first wall 200 and thereafter the second wall 201 to the third wall 202 and to the fourth wall 203 using the bendable projection 20g to fit the second wall 201 between the third 202 and the fourth wall 203.

Furthermore, as shown in FIG. 4, the coil 11 comprises an electrical conductor 110 that forms a plurality of windings 111, wherein the windings 111 extend around a coil axis W of the coil 11 and along a circumferential direction C of the coil 11. Particularly, according to an embodiment, the coil axis W extends parallel to the magnetizations M1, M2 of the magnet structures 30, 31 that are e.g. shown in FIGS. 3 and 10.

Preferably, as shown in FIG. 4 (and in FIGS. 5 and 6 in a schematical fashion), the mover 10 comprises a frame 12 that holds the coil 11. Preferably, the frame 12 surrounds the coil 11 in the circumferential direction C of the coil 11.

Figure 5:
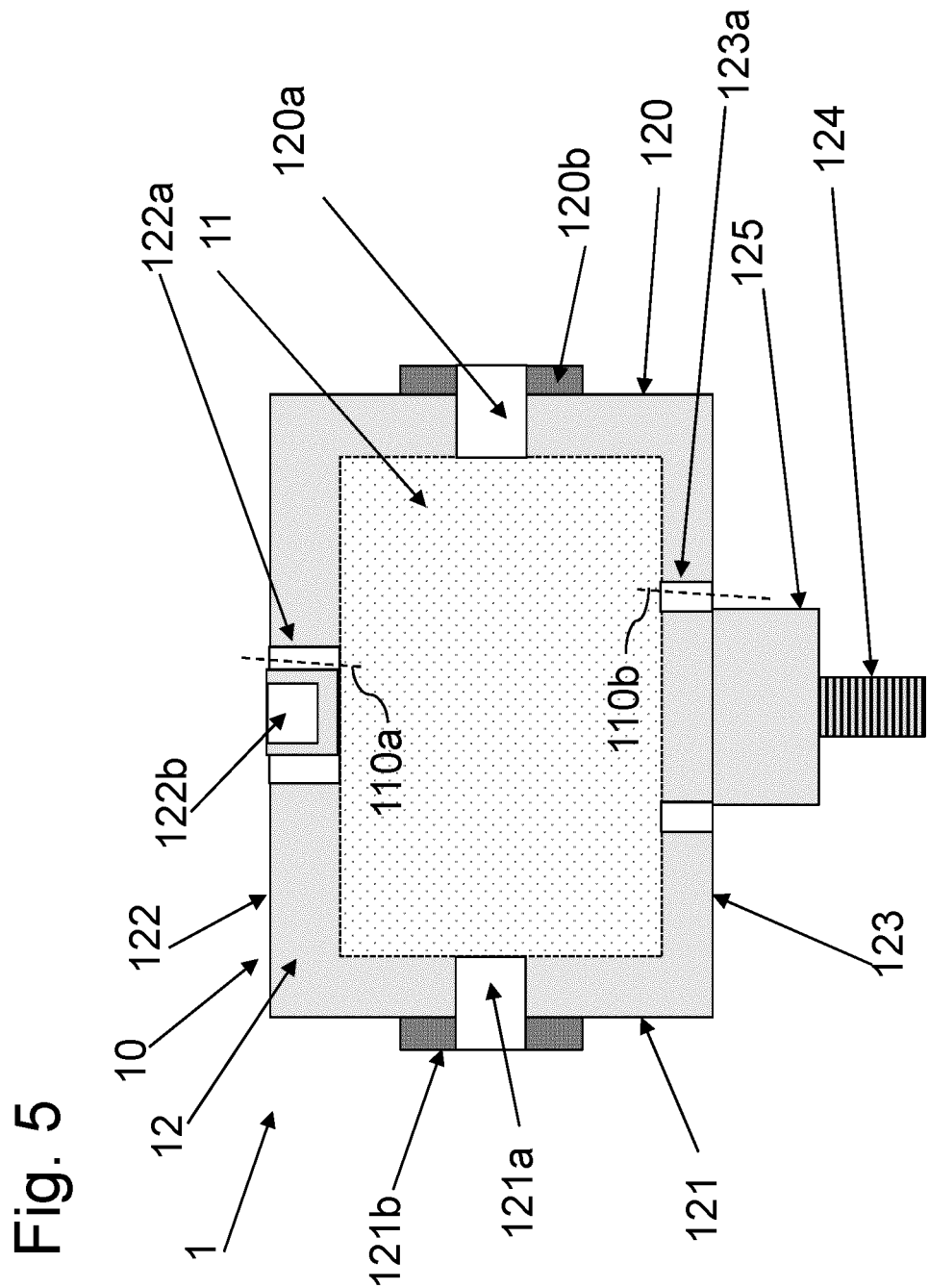
FIG. 5 shows a schematical cross sectional view of a mover of an embodiment of an actuator according to the present invention, wherein the mover is configured to be guided by two springs (not shown)
Figure 6:
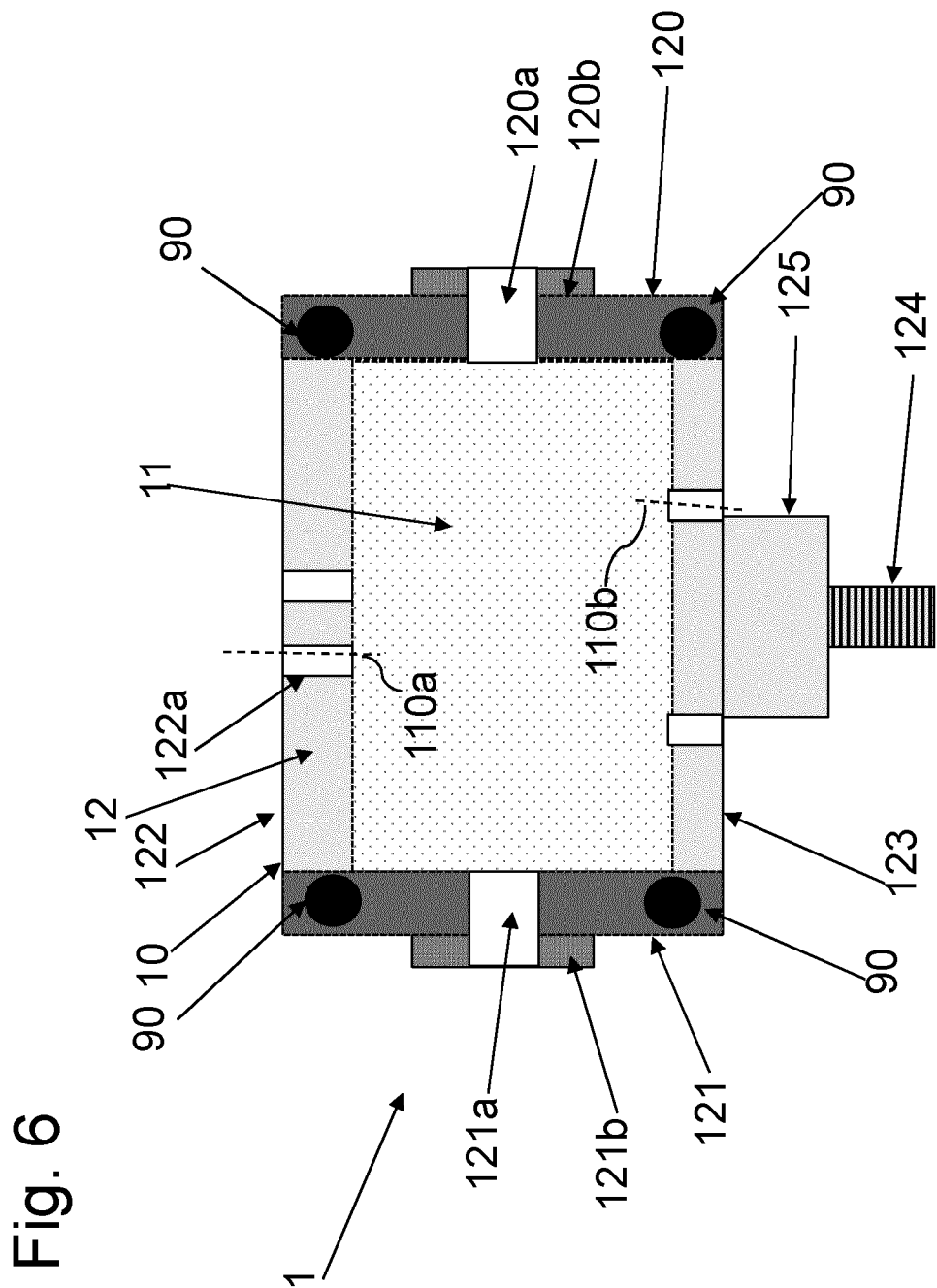
FIG. 6 shows a schematical cross sectional view of a mover of an embodiment of an actuator according to the present invention, wherein the mover is configured to be guided by a housing of the actuator using ball bearings.

Particularly, as indicated in FIGS. 5 and 6, the respective frame 12 comprises a front side 120 and a back side 121 facing away from the front side 120.

Furthermore, particularly, the frame 12 comprises a top side 122 and a bottom side 123, wherein the bottom side 123 faces away from the top side 122, and wherein the top side 122 is connected via the front side 120 and the back side 121 to the bottom side 123 of the frame 12.

Furthermore, the front side 120 of the frame 12 comprises a through hole 120a that is at least partially filled with a glue to bond the coil 11 to the frame 12. Likewise, the back side 121 of the frame 12 comprises a through hole 121a that is at least partially filled with a glue to bond the coil 12 to the frame 12.

For providing an electrical connection to the coil 11, the top side 122 of the frame 12 preferably comprises a through hole 122a, wherein a first end section 110a of the conductor 110 of the coil 11 extends through the through hole 122a of the top side 122 to provide an electrical connection to the coil 11. In a similar fashion, the bottom side 123 of the frame 12 comprises a through hole 123a, wherein a second end section 110b of the conductor 110 of the coil 11 extends through the through hole 123a of the bottom side 123 to provide an electrical connection to the coil 11.

Further, for delimiting a movement of the mover 12 in the first and second motion direction D1, D2, the frame 12 comprises a first protrusion 120b on the front side 120 of the frame 12 that is preferably configured to engage with the above-described guiding recess 200a formed in the first wall 200 of housing 20. In a similar fashion, the frame 12 comprises a second protrusion 121b on the back side 121 of the frame 12 for limiting a movement of the mover 10 in the first and in the second motion direction D1, D2, wherein this protrusion 121b is configured to engage with the second guiding recess 201a formed in the second wall 201.

Figure 15:
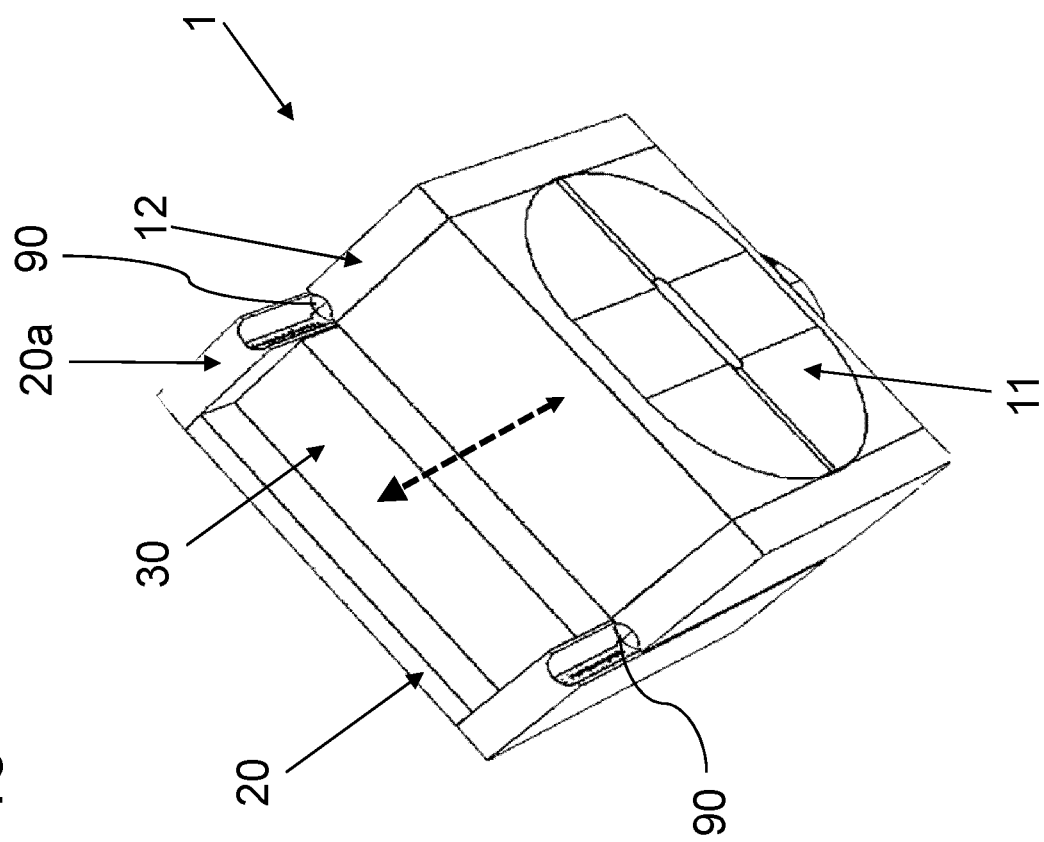
FIG. 15 shows an alternative embodiment of an actuator according to the present invention, wherein the mover is guided via ball bearings by the housing of the actuator.

As indicated in FIGS. 6 and 15, the housing 20 can be used to guide a movement of the mover 10 with respect to the first and the second motion direction D1, D2 through ball bearings 90 that are arranged between the mover 10 and the housing 20.

Figure 13:
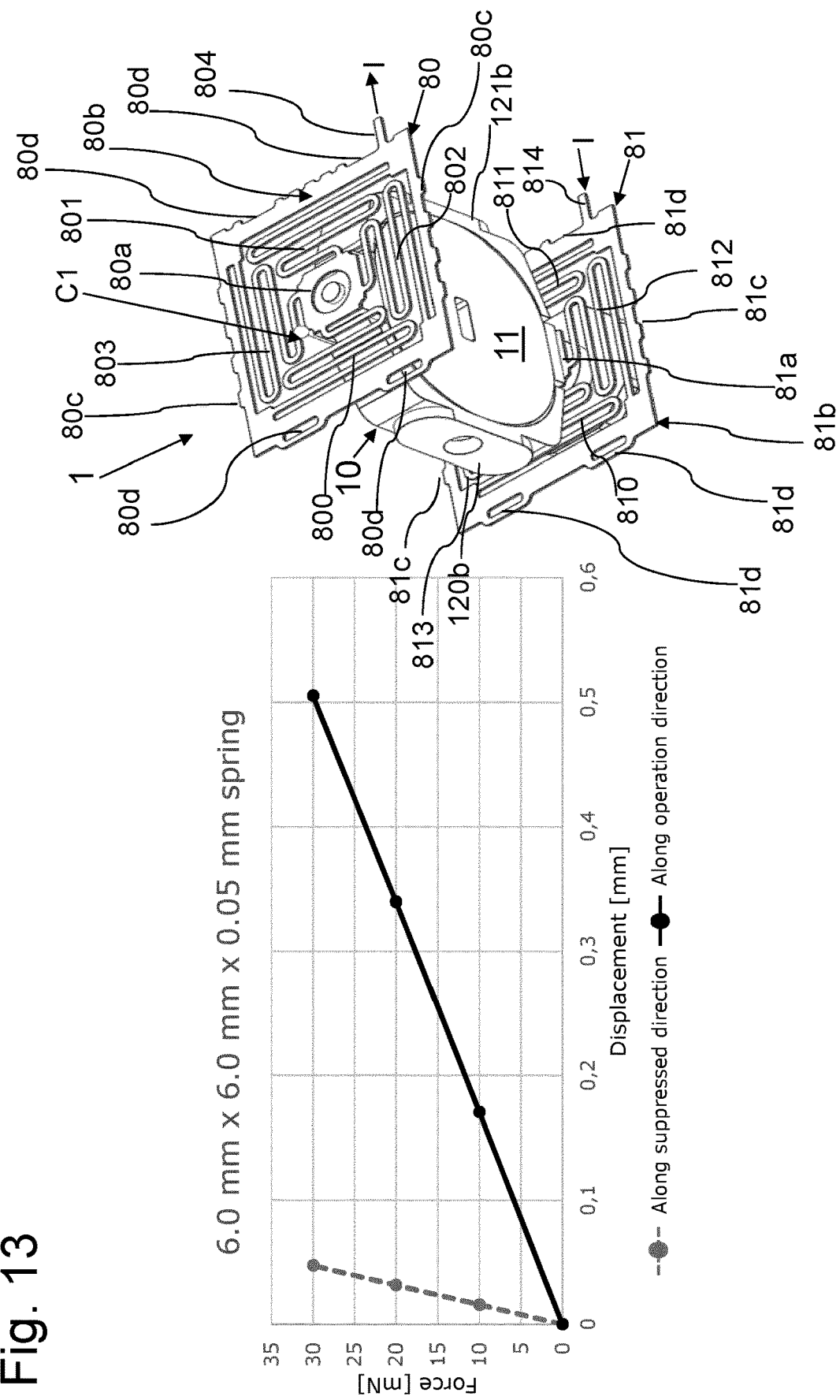
FIG. 13 shows a support of the mover of an actuator by means of two springs according to an embodiment of the actuator according to the present invention (right-hand side) as well as the force necessary (left-hand side) to achieve a displacement of the mover in the first or second motion direction (operation direction) or perpendicular to these directions (suppressed direction)
Figure 14:
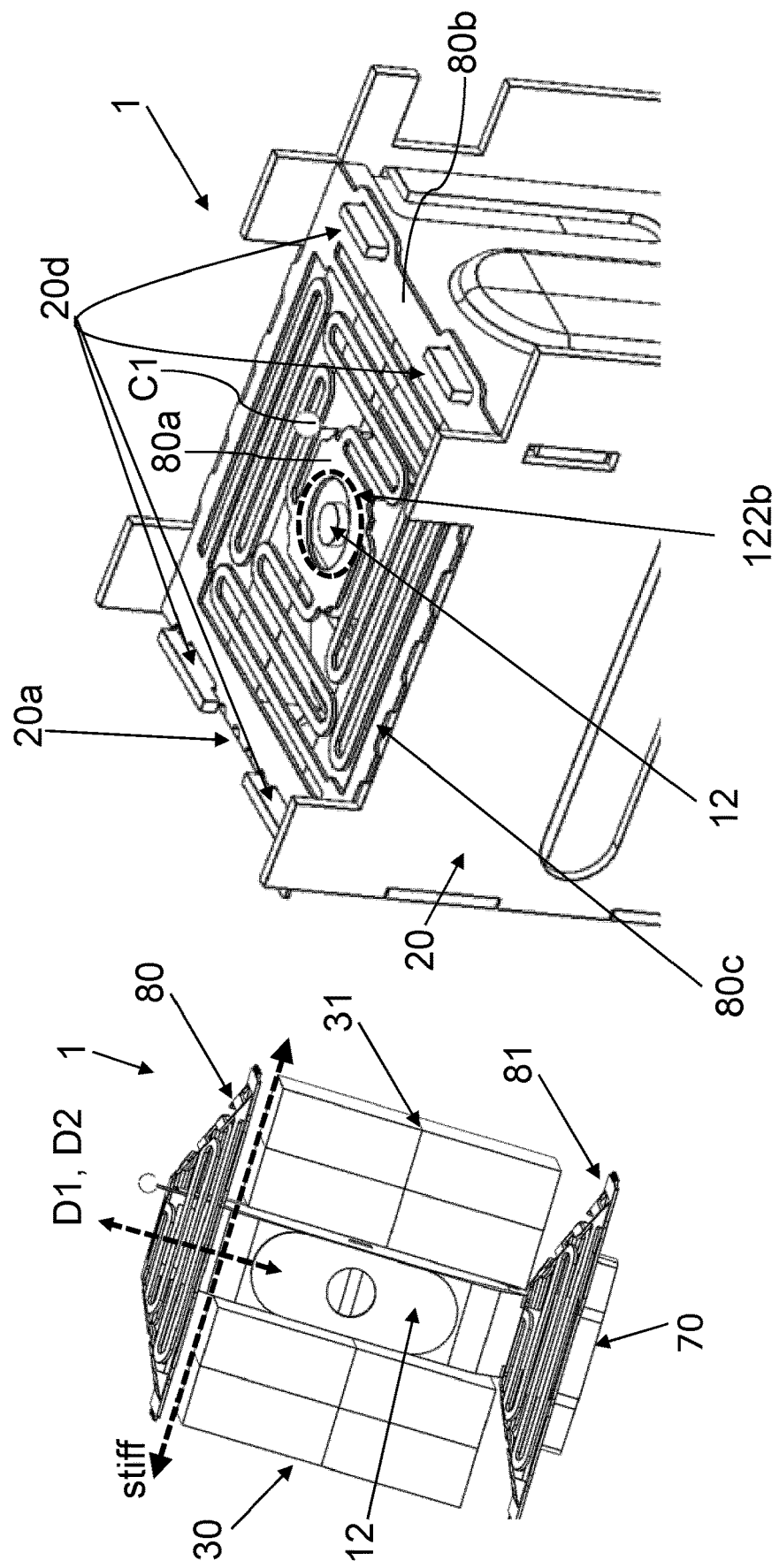
FIG. 14 shows a perspective view of the mover of an embodiment of an actuator according to the present invention, wherein the mover is supported by two spring structures (left-hand side), and a perspective view of the upper first spring that is coupled to the housing of the actuator (right-hand side)

Alternatively, as shown e.g. in FIGS. 3, 13 and 14 the actuator 1 may also be guided by a first and a second spring 80, 81, wherein the respective spring 80, 81 connects the mover 10 to the housing 20, particularly to the top portion or to the bottom portion of the housing, to allow a movement of the mover 10 in the first and in the second motion direction D1, D2 and to suppress a movement of the mover 10 in a direction perpendicular to the first and second motion direction D1, D2 (labelled "stiff" in FIG. 14, left-hand side).

Particularly, as can be seen in FIG. 13, the first spring 80 comprises four arms 800, 801, 802, 803 extending from a central fastening portion 80a of the first spring 80 to an outer circumferential fasting portion 80b of the first spring 80, wherein the respective arm 800, 801, 802, 803 comprises a meandering shape, wherein the central fastening portion 80a is connected to the top side 122 of the frame 12, and wherein the outer fastening portion 80b is connected to the top portion 20a of the housing 20.

Preferably, the central fastening portion 80a of the upper first spring 80 is glued to the top side 122 of the frame 12 of the mover 10. Particularly, the outer fastening region 80b is glued to the top portion 20a of the housing 20. Particularly, the outer fastening portion 80b comprises two opposing undulated edges 80c, particularly to increase an effective glue area.

Furthermore, the top side 122 of the frame 12 preferably comprises a recess 122b (e.g. a blind hole or a groove) that is at least partially filled with a glue to bond the central fastening portion 80a of the first spring 80 to the top side 122 of the frame 12.

As shown in FIG. 14 on the right-hand side the first spring 80 is connected in an electrically conducting fashion via an electrical connection Cl to the first end section 110a of the conductor (110) of the coil (11) (cf. e.g. FIG. 5), wherein the first spring 80 comprises an electrical contact 804 configured to connect the first spring 80 to an electrical current source (cf. FIG. 13).

The second spring 81 (cf. e.g. FIG. 13) also connects the mover 10 to the housing 20, particularly to the bottom portion 20b of the housing 20, to allow a movement of the mover 10 in the first and in the second motion direction D1, D2 and to suppress a movement of the mover 10 in a plane perpendicular to the first and second motion direction D1, D2.

Like the first spring 80, the second spring 81 preferably comprises four arms 810, 811, 812, 813 extending from a central fastening portion 81a of the second spring 81 to an outer circumferential fasting portion 81b of the second spring 81, wherein the respective arm 810, 811, 812, 813 comprises a meandering shape, wherein the central fastening portion 81a of the second spring 81 is connected to the bottom side 123 of the frame 12, while the outer fasting portion 81b of the second spring 80 is connected to the bottom portion 20b of the housing 20.

Particularly, the central fastening portion 81a is glued to the bottom side 123 of the frame 12 of the mover 10. Particularly, the outer fastening region 81b of the second spring 81 is glued to the bottom 20b portion of the housing 20. Particularly, the outer fastening portion 81b comprises two opposing undulated edges 81c, particularly to increase an effective glue area.

Also the second spring 81 is preferably connected in an electrically conducting fashion to the second end section 110b of the conductor 110 of the coil 11, wherein the second spring 81 comprises an electrical contact 814 configured to connect the second spring 81 to an electrical current source.

Now, in order to align the first spring 80 with respect to the housing 20, the latter comprises a plurality of projections 20d on the top portion 20a of the housing 20, wherein each projection 20d engages with a recess 80d formed in the outer fastening portion 80b of the first spring 80, wherein the respective recess 80d can be a cut-out or through hole. Preferably, two projections 20d of said plurality of projections 20d protrude from the first wall 200 at the top portion 20a of the housing 20, and wherein two further projections 20d of said plurality of projections 20d protrude from the second wall 201 at the top portion 20a of the housing 20.

In the same fashion, the second spring 81 can be aligned using a plurality of projections 20e on the bottom portion 20b of the housing 20, wherein each projection 20e on the bottom portion 20b of the housing 20 engages with a recess 81d (e.g. cut-out or though hole) formed in the outer fastening portion (81b) of the second spring (81). Preferably, two projections 20e of said plurality of projections 20e protrude from the first wall 200 at the bottom portion 20b of the housing 20, while to further projections 20e protrude from the second wall 201 at the bottom portion 20b of the housing 20.

Figure 16:
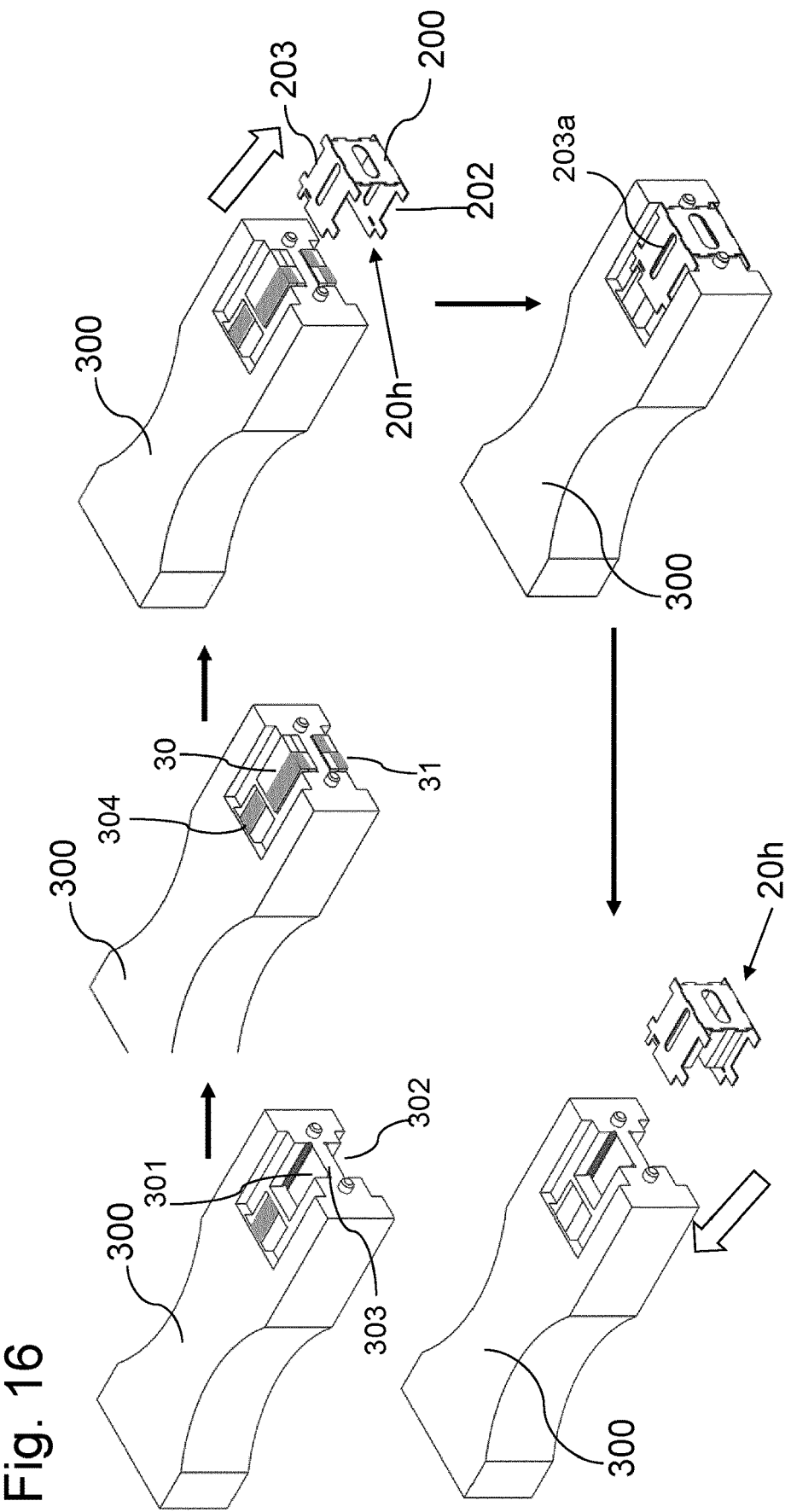
FIG. 16 shows a tool for mounting the magnet structures to the inside of the housing of an actuator according to the present invention.

Furthermore, as shown in FIG. 16, for efficiently mounting the two magnet structures 30, 31 of the actuator 1 to the housing 20, particularly to a housing section 20h comprising the first wall 200, the third wall 202 and the fourth wall 203, a dedicated tool 300 is preferably used, that comprises two recesses 301, 302 separated by a wall 303, wherein each recess 301, 302 is configured to receive one of the magnet structures 30, 31 and wherein the tool 300 is configured to engage with the housing section 20h such that the housing section 20h covers the recesses 301, 302 when the respective magnet structure 30, 31 is arranged in its associated recess 301, 302 of the tool 300 to allow gluing the housing section 20h to the respective magnet structure 30, 31.

Particularly, the tool 300 can comprise a magnet 304 adjacent each recess 301, 302 to help align the respective magnet structure 30, 31 when it is placed in the respective recess 301, 302 of the tool 300.

Using the tool 300, each magnet structure 30, 31 is arranged in one of the recesses of the tool 300, the housing section 20h is arranged on the tool 300 such that it covers the magnet structures 30, 31 arranged on the tool 300, and the magnet structures 30, 31 are glued to the housing section 20h using the through holes 202a, 203a of the third and fourth wall 202, 203, and wherein the housing section 20h is removed from the tool 300 after having glued the magnet structures 30, 31 to the housing section 20h. Afterwards, the second wall 201 can be mounted to the housing section 20h.

The invention claimed is:

1. An actuator for an optical device, comprising
a movable mover comprising a coil, wherein the mover is configured to be connected to a piston for moving the piston, a support structure wherein the mover is movable with respect to the support structure,
two magnet structures configured to interact with the coil to move the mover and therewith the piston, wherein the two magnet structures are connected to the support structure such that the coil is arranged between the two magnet structures,
the mover is configured to be moved relative to the support structure in a first motion direction or in an opposite second motion direction,
the actuator comprises a first magnetic flux guiding member that is connected to the mover such that the first magnetic flux guiding member is separated from the two magnet structures by a first air gap to generate a reluctance force that acts on the mover in the second motion direction and/or
the actuator comprises a second magnetic flux guiding member that is connected to the mover such that the second magnetic flux guiding member is separated from the magnet structures by a second air gap to generate a reluctance force that acts on the mover in the first motion direction.

2. The actuator according to claim 1, wherein the coil comprises a first portion in which an electrical current generated in the coil flows in a first current direction, and wherein the electrical coil comprises a second portion in which the electrical current flows in a second current direction, wherein the first current direction is oriented opposite to the second current direction, and wherein each magnet structure comprises a first portion having a first magnetization and a second portion having a second magnetization, wherein the first and the second magnetization point in opposite directions, and wherein the first portion of the first magnet structure faces the first portion of the second magnet structure, and wherein the first portion of the coil is arranged between the first portion of the first magnet structure and the first portion of the second magnet structure, and wherein the second portion of the first magnet structure faces the second portion of the second magnet structure, and wherein the second portion of the coil is arranged between the second portion of the first magnet structure and the second portion of the second magnet structure.

3. The actuator according to claim 1, wherein the first magnetizations of the first portions of the magnet structures extend perpendicular to the first current direction, and wherein the second magnetizations of the second portions of the magnet structures extend perpendicular to the second current direction such that a Lorentz force acts on each portion of the coil when an electrical current flows through the electrical coil, which Lorentz forces move the mover in the first motion direction or in the second motion direction depending on the orientation of the first and second current direction.

4. The actuator according to claim 1, wherein the first magnetic flux guiding member is a first magnetic flux guiding ring member.

5. The actuator according to claim 1, wherein the second magnetic flux guiding member is a second magnetic flux guiding ring member.

6. The actuator according to claim 1, wherein the actuator comprises a control unit configured to control a movement of the mover, wherein the control unit is configured to adjust an electrical current flowing through the coil such that an actual position of the mover approaches a desired position of the mover, wherein the actuator comprises a Hall sensor that is configured to measure a magnetic field of a permanent magnet of the actuator that is arranged on the mover to provide an output signal indicative of the actual position of the mover.

7. The actuator according to claim 1, wherein the coil comprises an electrical conductor that forms a plurality of windings, wherein the windings extend around a coil axis of the coil and along a circumferential direction of the coil, wherein the mover comprises a frame that holds the coil, and wherein the frame surrounds the coil in the circumferential direction of the coil.

8. The actuator according to claim 7, wherein the frame comprises a front side and a back side facing away from the front side, wherein the frame comprises a top side and a bottom side, wherein the bottom side faces away from the top side, and wherein the top side is connected via the front side and the back side to the bottom side of the frame, wherein the front side of the frame comprises a through hole that is at least partially filled with a glue to bond the coil to the frame, and/or wherein the back side of the frame comprises a through hole that is at least partially filled with a glue to bond the coil to the frame.

9. The actuator according to claim 8, wherein the top side of the frame comprises a through hole, wherein a first end section of the conductor of the coil extends through the through hole of the top side to provide an electrical connection to the coil, and/or wherein the bottom side of the frame comprises a through hole, wherein a second end section of the conductor of the coil extends through the through hole of the bottom side to provide an electrical connection to the coil.

10. The actuator according to claim 7, wherein the frame comprises a first protrusion on the front side of the frame for limiting a movement of the mover in the first and in the second motion direction, wherein the frame comprises a second protrusion on the back side of the frame for limiting a movement of the mover in the first and in the second motion direction.

11. The actuator according to claim 7, wherein the bottom side of the frame comprises a pin for insertion into a through hole of the piston, wherein the pin protrudes from a stop arranged on the bottom side of the frame, wherein the stop is configured to butt against the piston to prevent the pin from protruding out of the through hole of the piston when the pin is inserted in the through hole of the piston.

12. The actuator according to claim 1, wherein the support structure of the actuator forms a housing surrounding the magnet structures and the mover, wherein the magnet structures are connected to an inside of the housing, and wherein particularly the housing comprises a top portion and a bottom portion.

13. The actuator according to claim 12, wherein the actuator comprises a first spring connecting the mover to the housing to allow a movement of the mover in the first and in the second motion direction and to suppress a movement of the mover in a direction perpendicular to the first and second motion direction.

14. The actuator according to claim 13, wherein the first spring comprises four arms extending from a central fastening portion of the first spring to an outer circumferential fasting portion of the first spring, wherein the respective arm comprises a meandering shape, wherein the central fastening portion is connected to the top side of the frame, and wherein the outer fastening portion is connected to the top portion of the housing, wherein the frame comprises a front side and a back side facing away from the front side, wherein the frame comprises a top side and a bottom side, wherein the bottom side faces away from the top side, and wherein the top side is connected via the front side and the back side to the bottom side of the frame.

15. The actuator according to claim 12, wherein the actuator comprises a second spring connecting the mover to the housing to allow a movement of the mover in the first and in the second motion direction and to suppress a movement of the mover in a direction perpendicular to the first and second motion direction.

16. The actuator according to claim 15, wherein the second spring comprises four arms extending from a central fastening portion of the second spring to an outer circumferential fasting portion of the second spring, wherein the respective arm comprises a meandering shape, wherein the central fastening portion of the second spring is connected to the bottom side of the frame, and wherein the outer fasting portion of the second spring is connected to the bottom portion of the housing, wherein the frame comprises a front side and a back side facing away from the front side, wherein the frame comprises a top side and a bottom side, wherein the bottom side faces away from the top side, and wherein the top side is connected via the front side and the back side to the bottom side of the frame.

17. An optical device comprising an actuator according to claim 1 and a piston connected to an elastically deformable wall member of the optical device, wherein the mover is connected to the piston for deforming the wall member.

* * * * *